(12) United States Patent
Kim et al.

(10) Patent No.: US 8,572,105 B2
(45) Date of Patent: Oct. 29, 2013

(54) METHOD AND SYSTEM FOR DESKTOP TAGGING OF A WEB PAGE

(75) Inventors: Sang-Heun Kim, Mississauga (CA); Charles Laurence Stinson, Mississauga (CA)

(73) Assignee: BlackBerry Limited, Waterloo (CA)

( * ) Notice: Subject to any disclaimer, the term of this patent is extended or adjusted under 35 U.S.C. 154(b) by 1113 days.

(21) Appl. No.: 12/119,328

(22) Filed: May 12, 2008

(65) Prior Publication Data

US 2008/0288476 A1 Nov. 20, 2008

Related U.S. Application Data

(60) Provisional application No. 60/924,503, filed on May 17, 2007.

(51) Int. Cl.
*G06F 17/30* (2006.01)
*G06F 7/00* (2006.01)

(52) U.S. Cl.
USPC .................. 707/758; 707/802; 707/803

(58) Field of Classification Search
USPC .................................. 707/758, 803
See application file for complete search history.

(56) References Cited

U.S. PATENT DOCUMENTS

| | | | |
|---|---|---|---|
| 6,311,180 B1 | 10/2001 | Fogarty | |
| 6,401,085 B1 | 6/2002 | Gershman et al. | |
| 6,405,204 B1 | 6/2002 | Baker et al. | |
| 6,601,100 B2 | 7/2003 | Lee et al. | |
| 6,925,595 B1 * | 8/2005 | Whitledge et al. | 715/234 |
| 6,983,287 B1 | 1/2006 | Jayanti et al. | |
| 7,120,702 B2 | 10/2006 | Huang et al. | |
| 7,134,073 B1 * | 11/2006 | Fiedorowicz et al. | 715/235 |
| 7,177,818 B2 | 2/2007 | Nair | |
| 2002/0003547 A1 | 1/2002 | Wang et al. | |
| 2002/0054090 A1 | 5/2002 | Silva et al. | |
| 2002/0087643 A1 | 7/2002 | Parsons et al. | |

(Continued)

FOREIGN PATENT DOCUMENTS

| | | |
|---|---|---|
| CA | 2433375 A1 | 12/2004 |
| CA | 2622625 A1 | 3/2007 |

(Continued)

OTHER PUBLICATIONS

International Search Report issued by the Canadian Intellectual Property Office dated Aug. 14, 2008 for International Application No. PCT/CA2008/000917 filed May 12, 2008.

(Continued)

*Primary Examiner* — Kuen Lu
(74) *Attorney, Agent, or Firm* — Gowling Lafleur Henderson LLP

(57) ABSTRACT

A system and method are provided for identifying and extracting a subset of data from a selected web page of a web site for display on a client machine. One or more instructions are applied to the selected web page for identifying and displaying a candidate subset of data on the client machine (i.e. a wireless mobile device). The instructions are applied in accordance with one or more pre-defined criteria defining one or more types of the subset of data, and one or more pre-defined confidence intervals defining a pattern for locating the subset of data in accordance with said one or more types on the selected web page. An interface may further be provided to allow the amendment or confirmation of the candidate subset of data.

22 Claims, 16 Drawing Sheets

(56) References Cited

U.S. PATENT DOCUMENTS

| | | |
|---|---|---|
| 2002/0120714 A1 | 8/2002 | Agapiev |
| 2002/0133484 A1 | 9/2002 | Chau et al. |
| 2002/0165861 A1* | 11/2002 | Gilmour .......................... 707/7 |
| 2002/0184266 A1 | 12/2002 | Blessin |
| 2003/0018668 A1 | 1/2003 | Britton et al. |
| 2003/0229900 A1 | 12/2003 | Reisman |
| 2004/0078362 A1 | 4/2004 | Kim et al. |
| 2004/0103091 A1 | 5/2004 | Lindblad et al. |
| 2004/0107243 A1* | 6/2004 | Tsyganskiy .................. 709/203 |
| 2004/0225865 A1 | 11/2004 | Cox et al. |
| 2004/0249824 A1 | 12/2004 | Brockway et al. |
| 2005/0022115 A1 | 1/2005 | Baumgartner et al. |
| 2005/0066037 A1 | 3/2005 | Song et al. |
| 2005/0192952 A1 | 9/2005 | El-Shimi et al. |
| 2005/0216492 A1 | 9/2005 | Singhal et al. |
| 2005/0273772 A1 | 12/2005 | Matsakis et al. |
| 2006/0173985 A1 | 8/2006 | Moore |
| 2007/0033521 A1 | 2/2007 | Sull et al. |
| 2007/0038643 A1 | 2/2007 | Epstein |
| 2007/0067304 A1* | 3/2007 | Ives ............................... 707/10 |
| 2007/0073593 A1 | 3/2007 | Perry et al. |
| 2007/0073758 A1* | 3/2007 | Perry et al. .................... 707/102 |
| 2008/0005686 A1* | 1/2008 | Singh ............................ 715/764 |

FOREIGN PATENT DOCUMENTS

| | | |
|---|---|---|
| EP | 0811939 A2 | 12/1997 |
| KR | 20040038458 A | 5/2004 |
| WO | 0103036 A1 | 1/2001 |
| WO | 2006034038 A2 | 3/2006 |
| WO | 2007024379 A2 | 3/2007 |

OTHER PUBLICATIONS

International Search Report issued by the Canadian Intellectual Property Office dated Aug. 14, 2008 for International Application No. PCT/CA2008/000919 filed May 12, 2008.

International Search Report issued by the Canadian Intellectual Property Office dated Aug. 26, 2008 for International Application No. PCT/CA2008/000909 filed May 12, 2008.

International Search Report issued by the Canadian Intellectual Property Office dated Aug. 14, 2008 for International Application No. PCT/CA2008/000918 filed May 12, 2008.

International Search Report issued by the Canadian Intellectual Property Office dated Aug. 4, 2008 for International Application No. PCT/CA2008/000915 filed May 12, 2008.

International Search Report issued by the Canadian Intellectual Property Office dated Sep. 2, 2008 for International Application No. PCT/CA2008/000908 filed May 12, 2008.

Xiao-Ling, Wang et al., "Enhancive index for structured document retrieval", Proceedings of the 12th International Workshop on Research Issues in Data Engineering: Engineering E-Commerce/E-Business Systems, Feb. 24-25, 2002, pp. 34-38.

International Search Report issued by the Canadian Intellectual Property Office dated Aug. 26, 2008 for International Application No. PCT/CA2008/000907 filed May 12, 2008.

International Search Report issued by the Canadian Intellectual Property Office dated Aug. 15, 2008 for International Application No. PCT/CA2008/000914 filed May 12, 2008.

International Search Report issued by the Canadian Intellectual Property Office dated Aug. 28, 2008 for corresponding International Application No. PCT/CA2008/000916 filed May 12, 2008.

Written Opinion of the International Searching Authority issued by the Canadian Intellectual Property Office dated Aug. 28, 2008 for corresponding International Application No. PCT/CA2008/000916 filed May 12, 2008.

Jung-Lee, Hsiao et al., "Versatile transcoding proxy for internet content adaptation", IEEE Transaction on Multimedia, vol. 10, Issue 4, Jun. 2008, pp. 646-658.

Schaefer, Robbie, "Fuzzy rules for HTML transcoding", Proceedings of the 35th Annual Hawaii International Conference on System Sciences, Jan. 7-10, 2002, pp. 1385-1393.

Extended European Search Report issued by the European Patent Office dated Jun. 23, 2010 for corresponding European Patent Application No. 08757084.2.

Chang Chia-Hui et al; "A Survey of Web Information Extraction Systems"; Oct. 1, 2006; IEEE Transactions on Knowledge and Data Engineering, IEEE Service Center, Los Alamitos, CA, US; LNKD-DOI:10.1109/TKDE.2006.152, pp. 1411-1428; XP002498754; Retrieved from the internet: URL: http://www.csie.ncu.edu.tw/chia/pub/iesurvey2006.pdf.; the whole document.

Agrawal, N et al; "EShopMonitor: a web content monitoring tool"; Data Engineering, 2004. Proceedings. 20th International conference on Boston, MA, USA, Mar. 30-Apr. 2, 2004, Piscataway, NJ, USA IEEE LNKD-DOI:10.1109/ICDE.2004.1320055, Mar. 30, 2004, pp. 817-820, XP010713566; ISBN: 978-0-7695-2065-0.

Clark, J et al.; "XML Path Language (XPath)—Version 1.0"; XP002342333; Retrieved from the internet: URL:http://www.w3.org/TR/xpath; Oct. 13, 1999.

Kistler, T. et al; "WebL—a programming language for the Web"; Computer Networks and ISDN Systems, North Holland Publishing. Amsterdam, NL; LNKD-DOI:10.1016/S0169-7552(98)00018-X, vol. 30, No. 1-7; Apr. 1, 1998, pp. 259-270, XP004121421; ISSN: 0169-7552; p. 264—left-hand column, paragraph r.

Freire, J. et al; "WebViews: Accessing Personalized Web Content and Services"; International World Wide Web Conference, XX, XX, May 1, 2001, pp. 1-12, XP002362221; ISBN: 978-1-59593-051-4.

Adelberg, B; "Nodose—A Tool for Semi-Automatically Extracting Structured and Semistructured Data From text Documents"; Sigmod Record, ACM, New York, NY, US LNKD-DOI:10.1145/276305.276330, vol. 27, Jun. 1, 1998, pp. 283-294; XP001080524; ISSN: 0163-5808.

Official Action dated Apr. 23, 2013, issued by the Canadian Intellectual Property Office for corresponding Canadian Patent Application No. 2,687,483.

\* cited by examiner

METHOD AND SYSTEM FOR DESKTOP TAGGING OF A WEB PAGE

CROSS-REFERENCE

This application claims the benefit of the prior filing of U.S. Provisional Patent Application Ser. No. 60/924,503 filed May 17, 2007, the disclosure of which is incorporated herein by reference.

COPYRIGHT

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights.

FIELD

The present application relates generally to telecommunications and more particularly to a system and method for desktop tagging of a web page.

BACKGROUND

Web sites host and provide information using web pages that are communicated electronically via a telecommunications network. Accessing this information by some client computing devices can be challenging. Computing devices are becoming smaller and increasingly utilize wireless connectivity. Examples of such computing devices include portable computing devices that include wireless network browsing capability as well as telephony and personal information management capabilities.

BRIEF DESCRIPTION OF THE DRAWINGS

FIG. 8A illustrates an example web page.

DETAILED DESCRIPTION OF THE EMBODIMENTS

Figure 1:
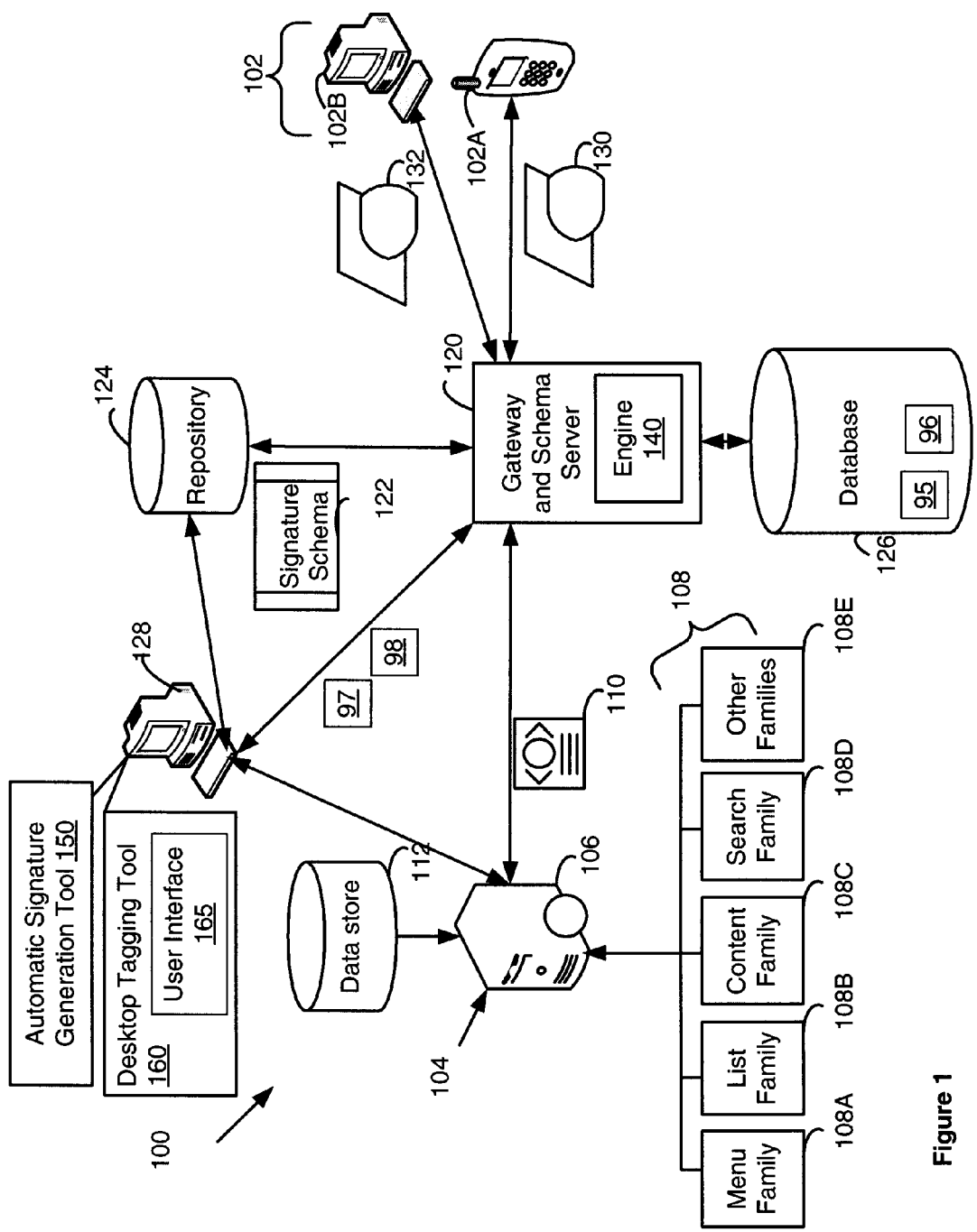
FIG. 1 is schematic representation of a system for content navigation.

The smaller size of most wireless mobile client devices limits their display capabilities. Furthermore the wireless connections to such devices typically have less or more expensive bandwidth than corresponding wired connections. The Wireless Application Protocol ("WAP") was designed to address such issues, but WAP can still provide a very unsatisfactory experience or even completely ineffective experience, particularly where the small client device needs to effect a connection with web sites that host web pages that are directed to traditional full desktop browsers.

In accordance with one aspect, there is provided a method and system of identifying a subset of data from a selected web page of a web site for display on a client machine. Instructions are applied to the selected web page for identifying and displaying a candidate subset of data on the client machine. The instructions applied are defined in accordance with one or more pre-defined criteria defining one or more types of the subset of data, and one or more pre-defined confidence intervals defining a pattern for locating the subset of data in accordance with said one or more types on the selected web page.

The pre-defined criteria may refer to the types of data for defining an item such as an image field, a description field and a price field. In one aspect, the subset of data includes an item (such as an e-commerce item for purchase) and its corresponding characterizing information such as image, description, and price.

In one aspect, an interface is provided to confirm or amend the candidate subset of data, wherein the candidate subset of data comprises at least one type of the subset of data and at least one value corresponding to each type for an item on the web page. In another aspect, the candidate subset of data as confirmed or amended may be stored to define a rich bookmark, the rich bookmark comprising an address of the web page and the stored candidate subset of data for subsequent retrieval and display.

In another aspect, a response is received via the interface amending the candidate subset of data; and in accordance with the response, at least one of: the pre-defined confidence intervals or the pre-defined criteria is updated.

In another aspect, the pre-defined confidence intervals are updated in response to receiving at least a pre-determined number of amendments to the candidate subset of data having a same type (i.e. belonging to an same type of field).

In another aspect, the client machine is a wireless mobile device requesting the selected web page, and the interface is presented on the wireless mobile device to allow the amend or confirm of the candidate subset of data, the amend or confirm defining the subsequent display of the candidate subset of data when requesting another web page.

In another aspect, the web site comprises an e-commerce web site and identifying a subset of data comprises identifying at least one e-commerce item for purchase from at least some of the web pages of the web site to conduct an e-commerce transaction on the wireless mobile device.

In another aspect, each of the pre-defined confidence intervals is based on information selected from the group consisting of: an estimated size, estimated relative location on the web page, estimated style, and estimated identifier associated with each type of the subset of data.

In another aspect, identifying the candidate subset of data further comprises: determining a plurality of probable candidate data matching the pre-defined criteria and at least one of the confidence intervals; defining a weight for each of the pre-defined confidence intervals to define a relative importance thereof; and ranking the plurality of probable candidate data based upon the weighting to determine at least one candidate data from the plurality of probable candidate data.

In another aspect, the pre-defined criteria are provided in accordance with a genre of said web site, said genre selected from the group of genres comprising e-commerce, news, sports, and weather.

In another aspect, the one or more types of the subset of data is selected from the group consisting of: an image, a description, a price, a title, and text data for characterizing the subset of data.

In yet another aspect, there is provided a computer program product storing one or more computer readable instructions for identifying a subset of data from a selected web page of a web site for display on a client machine. The instructions when executed by a computer processor configure the processor for: applying instructions to the selected web page for identifying and displaying a candidate subset of data on the client machine. The instructions are applied in accordance with one or more pre-defined criteria defining one or more types of the subset of data, and one or more pre-defined confidence intervals defining a pattern for locating the subset of data in accordance with said one or more types on the selected web page.

Referring now to FIG. 1, there is illustrated a system 100 for content navigation via a telecommunications network. In a present embodiment system 100 comprises a plurality of client computing devices in the form of client machines 102A and 102B (collectively 102), a web site server 106 hosting a web site 104 and a gateway and schema server 120. Devices 102 are respectively coupled to communicate with gateway and schema server 120 to obtain web pages (e.g. 110) transcoded from web site 104.

In the present embodiment, a web server 106 serves web pages (e.g. 110) which comprise web site 104. The web pages are defined from a plurality of web page family templates 108A-108D (collectively 108) and web page content (described further herein below) from data store 112. For ease within the present embodiment, only a single web site 104 is shown coupled via gateway and schema server 120; however, in another embodiment a plurality of different web sites may be so coupled. In the present embodiment of system 100, gateway and schema server 120 is coupled to a schema repository 124 from which to obtain a signature schema 122 for a particular web site. Signature schema documents (e.g. 122) provide instructions and data with which an engine 140 of server 120 can extract data from web pages (e.g. 110) and transcode same to a target format to provide transcoded web page data (e.g. 130 and 132) to the respective requesting client machines 102A and 102B as described more fully below. Gateway and schema server 120 may also be coupled to a database 126 for retrieving/storing data extracted from web sites in accordance with its operations. The database 126 may be a relational database storing extracted data from web sites in relation to the defined signature schema. The stored data can be accessed by a Structured Query Language (SQL). Signature schemas for respective web sites may be defined (e.g. coded) using a computing device 128 as described herein below.

Representative client machines 102 include any type of computing or electronic device that can be used to communicate and interact with content available via web sites. Each of the client machines 102 may be operated by a respective user U (not shown). Interaction with a particular user includes presenting information on a client machine (e.g. by rendering on a display screen) as well as receiving input at a client machine (e.g. such as via a keyboard for transmitting to a web site). In the present embodiment, client machine 102A comprises a mobile electronic device with the combined functionality of a personal digital assistant, cell phone, email paging device, and a web-browser. Such a mobile electronic device may comprise a keyboard (or other input device(s)), a display screen, a speaker, (and other output device(s) (e.g. LEDs)) and a chassis for housing such components. The chassis may further house one or more central processing units, volatile memory (e.g. random access memory), persistent memory (e.g. Flash read only memory) and network interfaces to allow client machine 102A to communicate over the telecommunication network.

Figure 2:
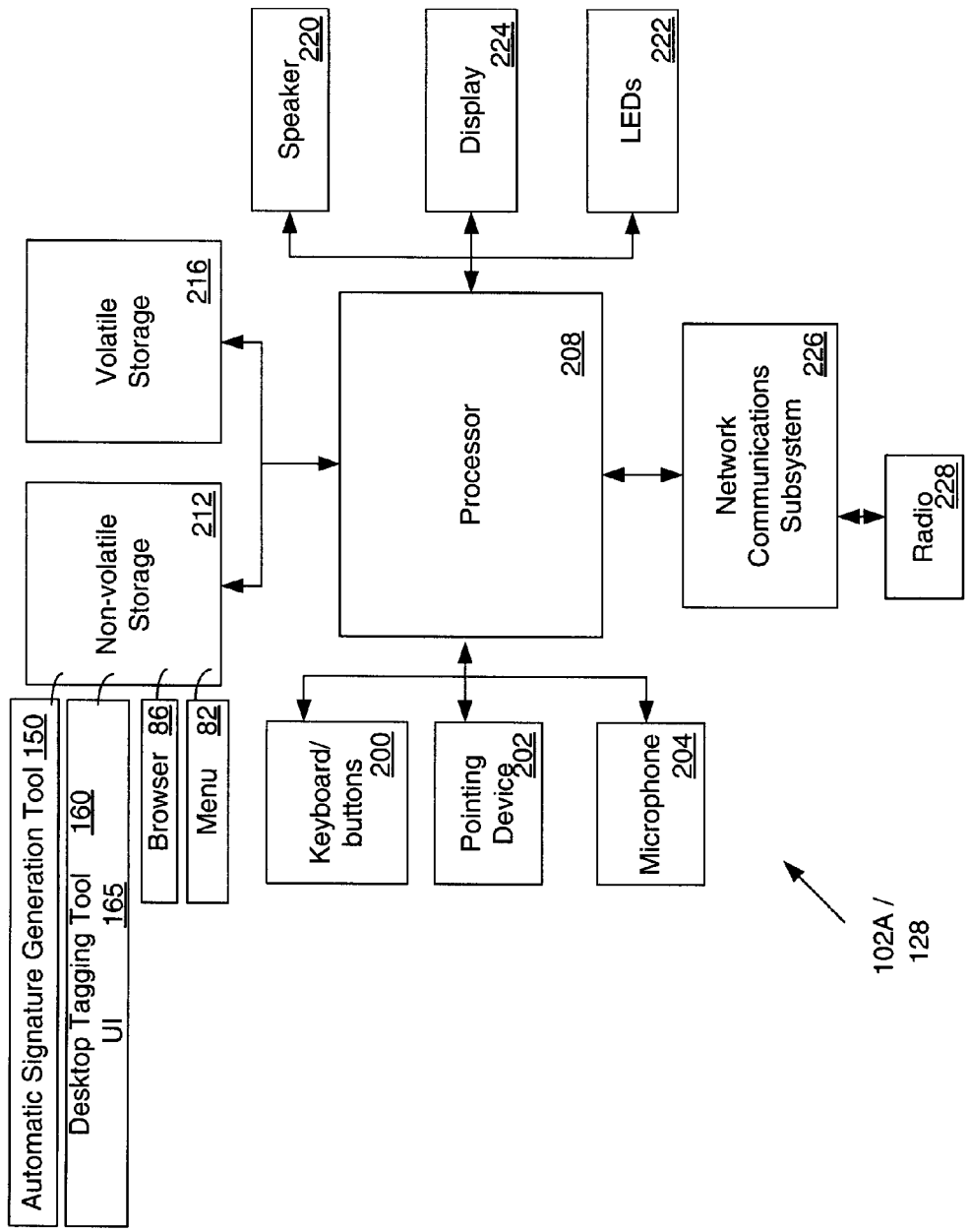
FIG. 2 is a schematic representation of a wireless communication device from FIG. 1.

Referring now to FIG. 2, a schematic block diagram shows client machine 102A/computing device 128 in greater detail. As will be understood by a person skilled in the art, that client machine 102B may include similar architectural components as those illustrated in FIG. 2. That is, client machine 102B may include one or more central processing units, volatile memory, persistent memory and network interfaces. The network interfaces allow the client machine 102B to communicate over a telecommunication network (including the World Wide Web), to connect to other client machines 102 and to other computing devices as will be needed. As well, the client machine 102B may include an input device (such as a keyboard and a mouse), a display screen, and output devices including a speaker, and one or more LEDs.

It should be emphasized that the structure in FIG. 2 is purely exemplary, and contemplates a device that may be used for both wireless voice (e.g. telephony) and wireless data (e.g. email, web browsing, text) communications. Client machine 102A/computing device 128 includes a plurality of input devices which in a present embodiment includes a keyboard and, typically, additional input buttons, collectively 200, an optional pointing device 202 (e.g. a trackball or trackwheel) and a microphone 204. Other input devices, such as a touch screen, and camera lens are also contemplated. Input from keyboard/buttons 200, pointing device 202 and microphone 204 may be received at a processor 208. Processor 208 may be further operatively coupled with a non-volatile storage unit 212 (e.g. read only memory ("ROM"), Erasable Electronic Programmable Read Only Memory ("EEPROM"), or Flash Memory) and a volatile storage unit 216 (e.g. random access memory ("RAM"), speaker 220, display screen 224 and one or more lights (LEDs 222). Processor 208 may be operatively coupled for network communications via a subsystem 226. Wireless communications are effective via at least one radio (e.g. 228) such as for Wi-Fi or cellular wireless communications. Client machine 102A also may be configured for wired communications such as via a USB or other port and for short range wireless communications such as via a Bluetooth® radio (all not shown).

Programming instructions that implement the functional teachings of client machine 102A as described herein are typically maintained, persistently, in non-volatile storage unit 212 and used by processor 208 which makes appropriate utilization of volatile storage 216 during the execution of such programming instructions. Of particular note is that non-volatile storage unit 212 persistently maintains a web browser application 86 and, in the present embodiment, a native menu application 82, each of which can be executed on processor 208 making use of volatile storage 216 as appropriate. An operating system and various other applications (not shown)

are maintained in non-volatile storage unit 212 according to the desired configuration and functioning of client machine 102A, one specific non-limiting example of which is a contact manager application (also known as an address book, not shown) which stores a list of contacts, addresses and phone numbers of interest to user U and allows user U to view, update, and delete those contacts, as well as providing user U an option to initiate telecommunications (e.g. telephone, email, instant message (IM), short message service (SMS)) directly from that contact manager application.

Native menu application 82 may be configured to provide menu choices to user U according to the particular application (or other context) that is being accessed. By way of example, while user U is activating the contact manager application, user U can activate menu application 82 to access a plurality of menu choices available that are respective to contact manager application 90. For example, menu choices may include options to invoke other applications (e.g. a mapping application to map a contact's address) or communication functions (e.g. call, SMS, IM, email, etc.) on the client machine 102A for a particular contact. Menu application 82 may be associated to a particular input button (e.g. one of buttons 200) and invoked to provide a contextual menu comprised of a plurality of menu choices that are reflective of the context in which the button 200 was selected. Note that the options in a contextual menu are stored within non-volatile storage 212 as being specifically associated with a respective application. Menu application 82 may be therefore configured to generate a plurality of different contextual menus that are reflective of the particular context in which the menu application 82 is invoked. For example, in an email application where an email is being composed, invoking menu application 82 would generate a contextual menu that included the options of sending the email, cancelling the email, adding addresses to the email, adding attachments, and the like. The contents for such a contextual menu would also be maintained in non-volatile storage 212. Other examples of contextual menus will occur to those of ordinary skill in the art.

As noted, gateway and schema server 120 applies a signature schema to transcode a web page and provide transcoded data to a requesting client machine 102. Signature schema 122 may be configured to transcode navigational features of a web site 104 to provide menu options to menu application 82 for use when browsing the web site 104 with browser 86. The signature schema may further transcode web site content for presentation by the browser 86.

Figure 9A:
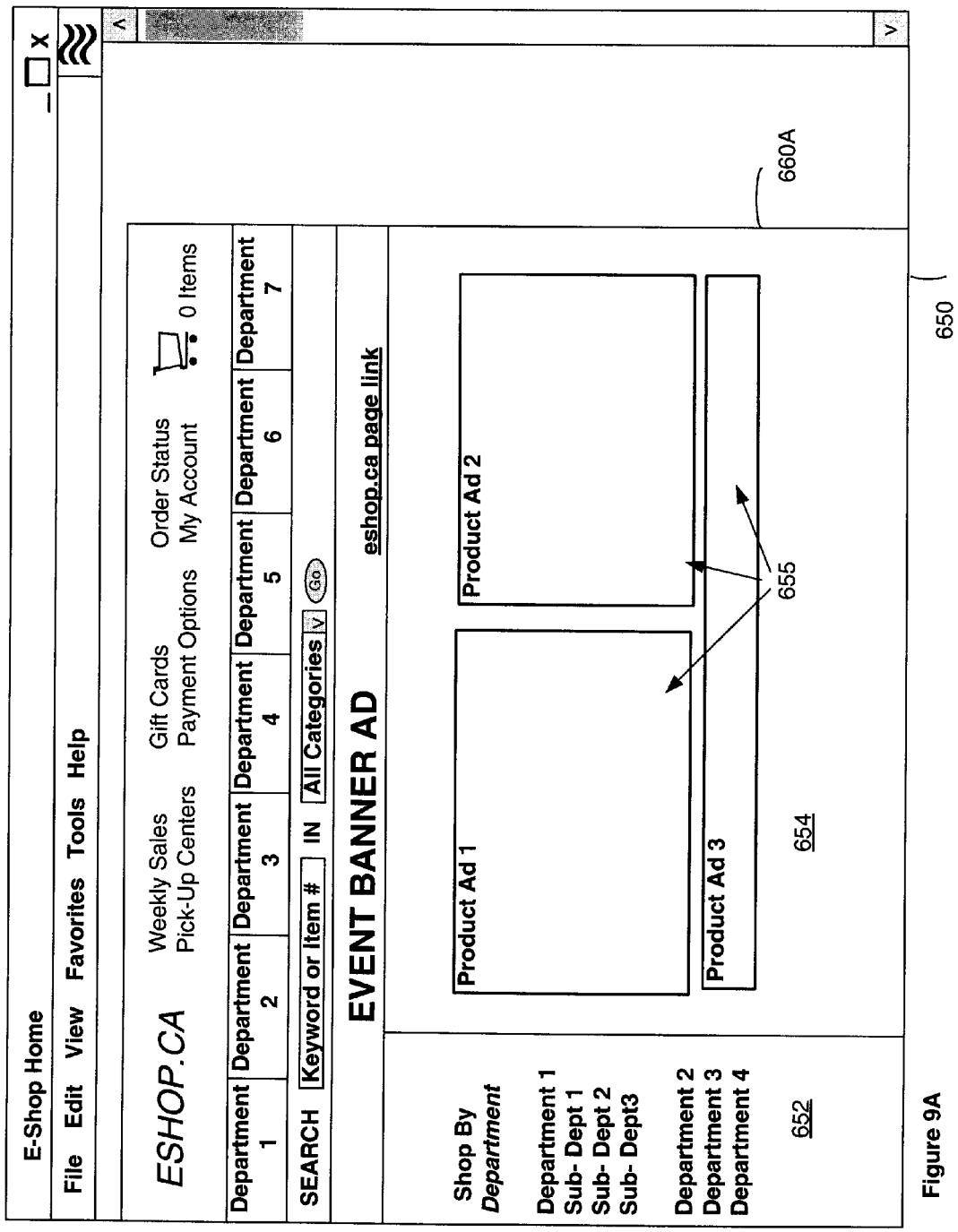
FIGS. 9A-9D and 10A-10D respectively illustrate representative web pages rendered on a first browser window and portions of said representative web pages transcoded and rendered on a second browser window in accordance with an embodiment.
Figure 9B:
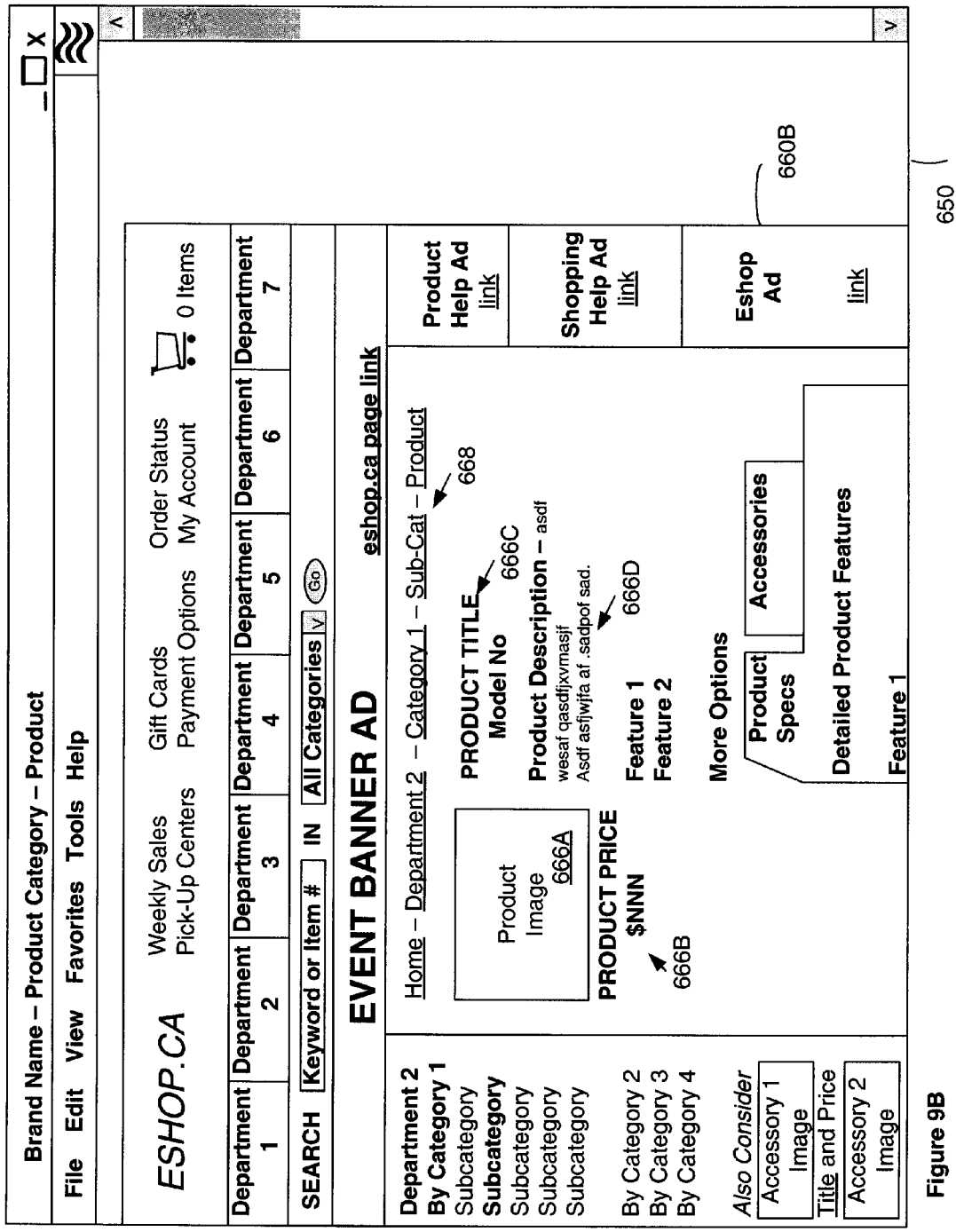
Figure 9C:
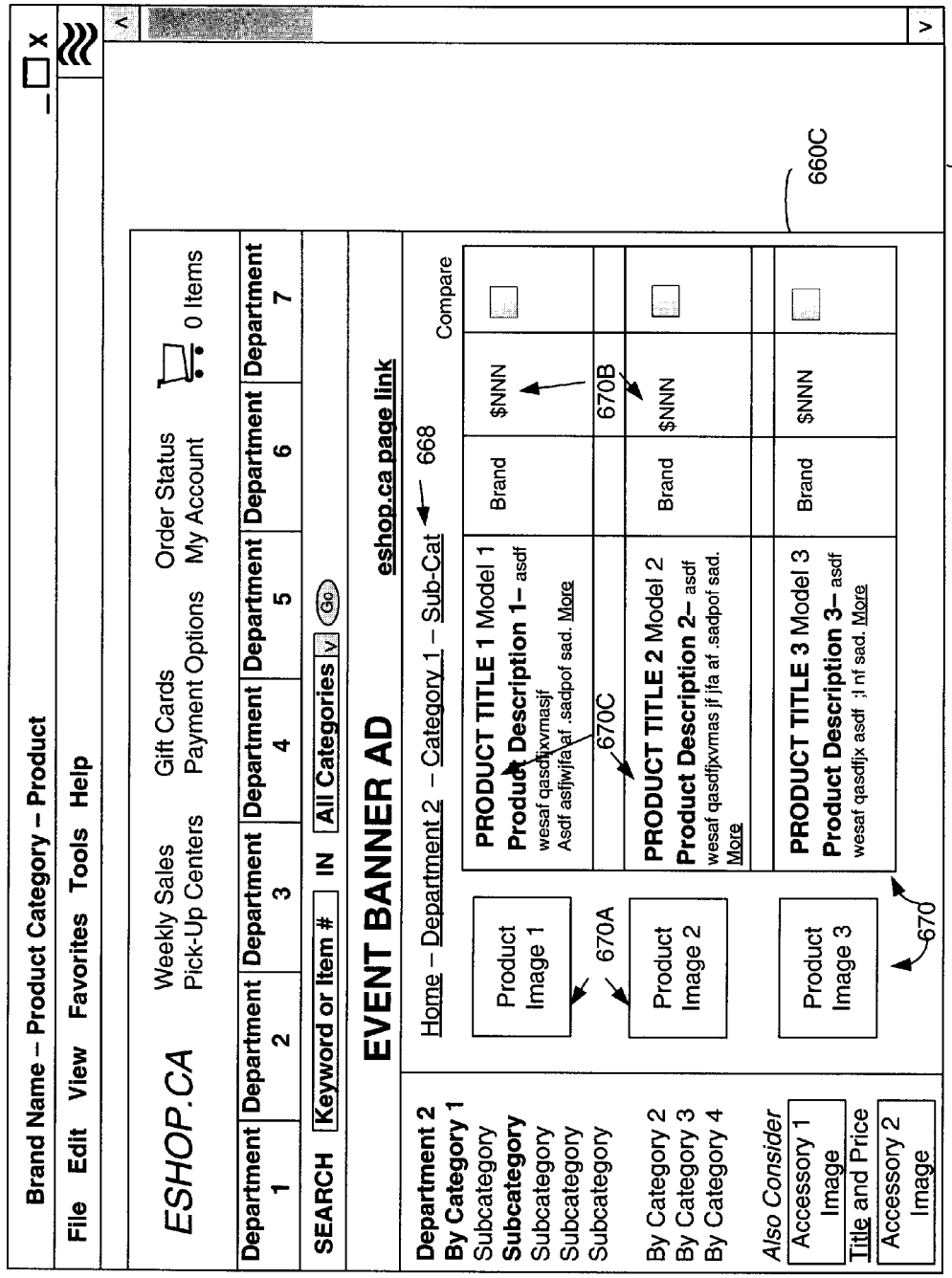
Figure 9D:
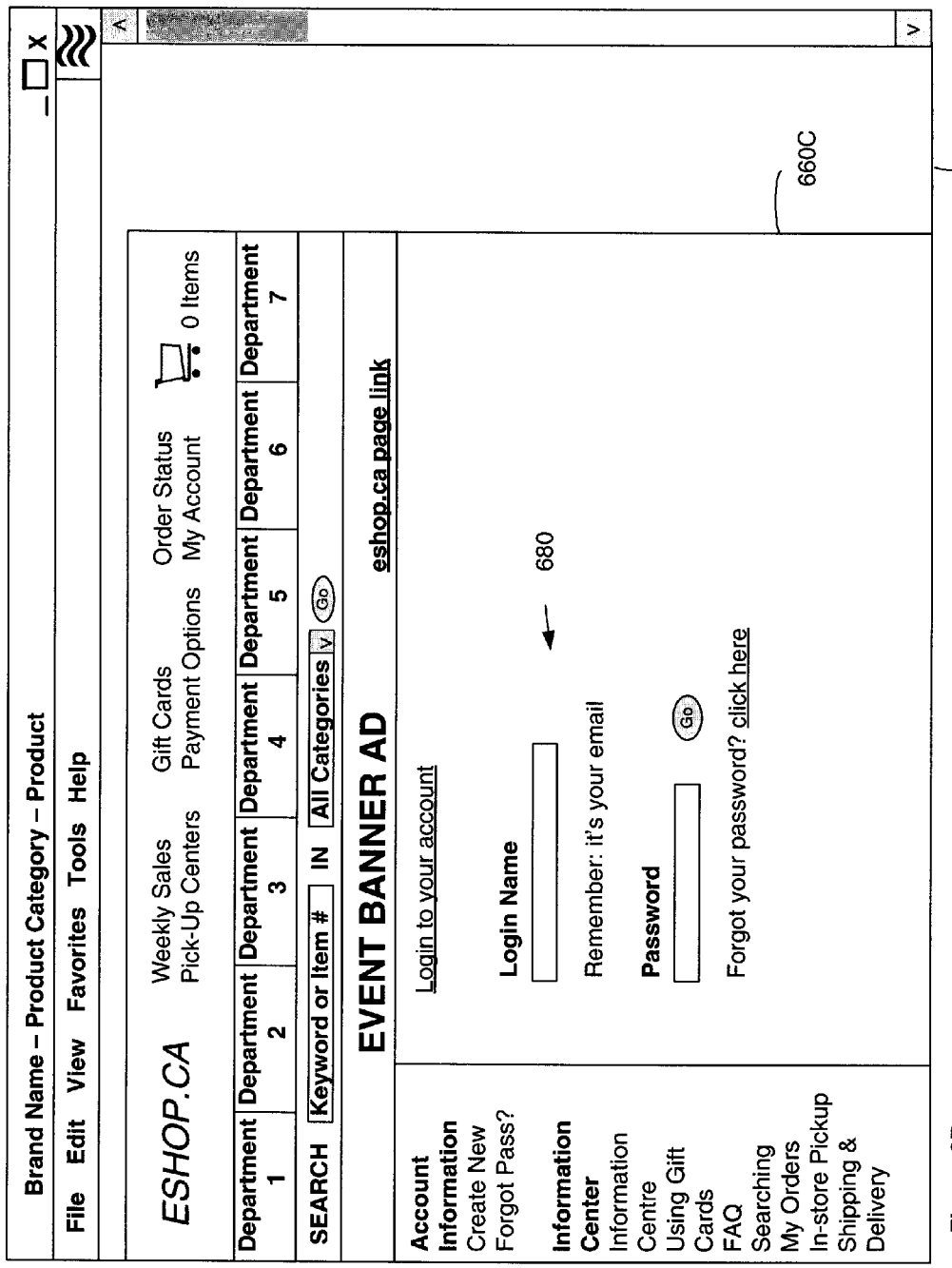
Figure 10A:
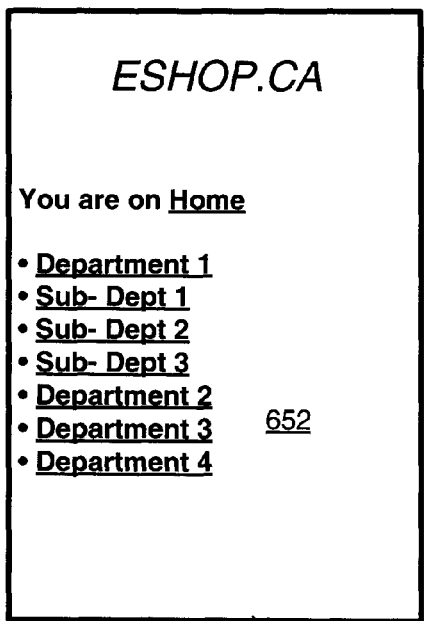

FIGS. 9A-9D and 10A-10D respectively illustrate representative web pages rendered on a first browser window and portions of a subset of data from said representative web pages transcoded and rendered on a second browser window in accordance with an embodiment. FIG. 9A illustrates a representative home web page 660A of an e-commerce web site (e.g. 104) in a browser window 650. Window 650 is illustrative of a rendering to a large size display device (e.g. desktop monitor). Web page 660A comprises, among other things, a menu portion 652 and a primary content display portion 654, in the example, showing various advertisements 655 for products. FIG. 10A illustrates the menu portion 652 extracted and transcoded and rendered as a web page on a second browser window 750. Window 750 is illustrative of a rendering to a small size display device (e.g. of a wireless mobile device). In addition to transcoding as a web page, menu portion 652 may be transcoded for menu application 82 e.g. for invocation when browsing the site 104 as referenced further herein.

Figure 10B:
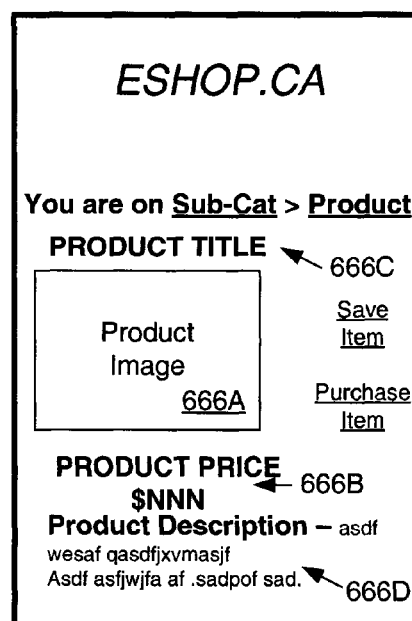
Figure 10C:
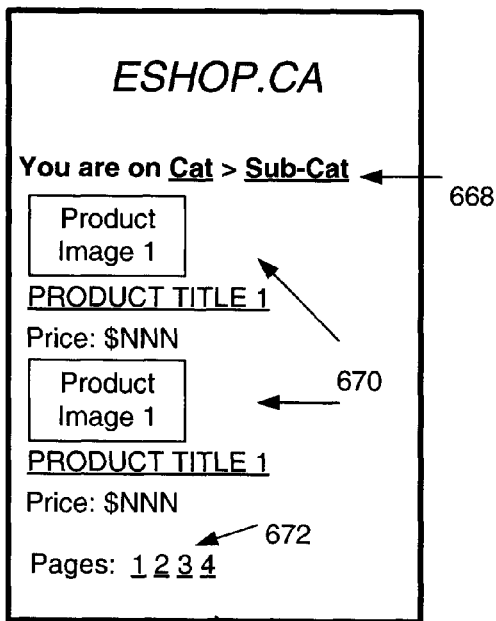

FIG. 9B illustrates an exemplary product web page 660B in window 650 showing various product data (collectively 666) including image 666A, price 666, title 666C and description 666D data that is transcoded and shown in window 750 of FIG. 10B. Also transcoded is the web page hierarchy list 668 showing where the page is on the web site.

FIG. 9C illustrates an exemplary product list web page 660C in window 650 showing a list of products (collectively 670). A subset of the product data such as image 670A, price 670B, and title 670C is transcoded and shown in window 750 of FIG. 10C. Note that multiple pages 672 may be provided for the list 670.

Figure 10D:
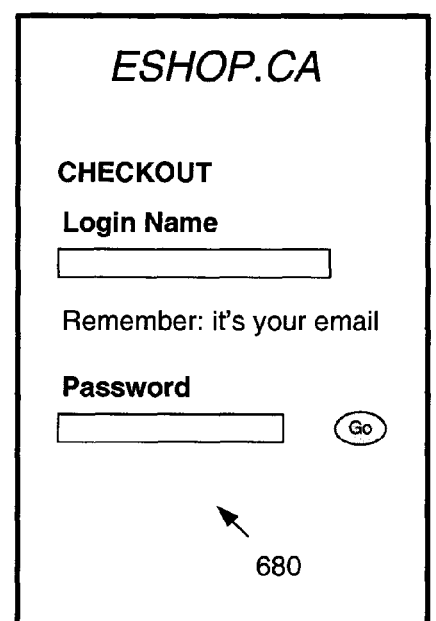

FIG. 9D illustrates an exemplary account checkout web page 660D in window 650 showing a login form 680 for receiving account login and password, which form is transcoded and shown in window 750 of FIG. 10D. Though not shown, other checkout pages (e.g. for payment or order confirmation, etc.), search pages, product and information pages may be similarly transcoded.

Returning now to FIG. 1, web server 106 and gateway and schema server 120 (which can, if desired, be implemented on a single server) can be based on any commonly available server environments or platforms including a module that houses one or more central processing units, volatile memory (e.g. random access memory), persistent memory (e.g. hard disk devices) and network interfaces to allow servers 106 and 120 to communicate over the telecommunications network. Web server 106 hosts software applications comprising instructions and data for generating and serving web pages dynamically from the template families 108 and current informational content therefore from data store 112. Load balancing, security/firewall, billing, account and other applications may also be present.

Gateway and schema server 120 hosts software applications comprising instructions and data for proxying requests and responses between the client machines 102 and web site 104. In addition to software for maintaining HTTP communications, performing requests, maintaining sessions, handling cookies, etc., engine 140 may be implemented in software to apply the signature schemas to web pages from web sites. There may be provided an interpreter that interprets the signature schema document and applies the actions against the web page code (as an ASCII (plain text) document) to extract the subset of data to produce a result set. A renderer may be provided to express the subset of data result set (i.e. transcode to a target format such as cHTML (Compact HTML) for a mobile device browser) for transmitting to the client machines also in accordance with the signature schema. A cache feature may also be provided for storing/retrieving data from database 126. Caching may comprise storing web pages from the web site as well as extracted data from which to build a relational database of object and elements and their relationships. The gateway and schema server (or a separate server (not shown)) may host a web site engine to provide content extracted from the relational database (e.g. stored web site data) to the client machines 102.

Devices 102, schema server 120 and web site 104 are coupled via a telecommunication network (not shown) typically comprising a plurality of interconnected networks that may include wired and (at least for device 102A) wireless networks. It should now be understood that the nature of the network is not particularly limited and is, in general, based on any combination of architectures that will support interactions between client machines 102 and servers 106 and 120. In a present embodiment the network includes the Internet as well as appropriate gateways and backhauls.

More specifically, in the present embodiment, a wireless network for client machine 102A may be based on core mobile network infrastructure (e.g. Global System for Mobile communications ("GSM"), Code Division Multiple Access ("CDMA"), Enhanced Data rates for GSM Evolution ("EDGE"), Evolution Data-Optimized ("EV-DO"), High Speed Downlink Packet Access ("HSPDA"), Universal Mobile Telecommunications System ("UMTS"), etc.) or on wireless local area network ("WLAN") infrastructures such as the Institute for Electrical and Electronic Engineers ("IEEE") 802.11 Standard (and its variants) or Bluetooth or the like or hybrids thereof. In the present embodiment of system 100 it is contemplated that client machine 102B may be another type of client machine such as a PC (desktop or laptop or server) configured to include a full desktop computer or as a "thin-client". Typically such have larger display monitors/screens than portable machines like 102A. A wired network for system 100 and device 102B can be based on a T1, T3 or any other suitable wired connection.

As previously stated in relation to FIGS. 1 and 2, each of the client machines 102 is configured to interact with content available over the network, including web pages on web site 104. In a present embodiment, client machines 102A and 102B may navigate for content using a browser application (e.g. 86). As will be explained further below, on client machine 102A, browser application 86 may be a mini-browser in the sense that it may be configured to render web pages on the relatively small display 224 of client machine 102A. Often, during such rendering, those pages are presented in a format that may be different from how those pages are rendered on a traditional desktop browser application (e.g. browser 86 of client machine 102B). Mini-browsers typically attempt to convey substantially the same information as if the web pages had been rendered on a full browser such as Internet Explorer®, Safari® or Firefox® on a traditional desktop or laptop computer like client machine 102B.

Figure 3:
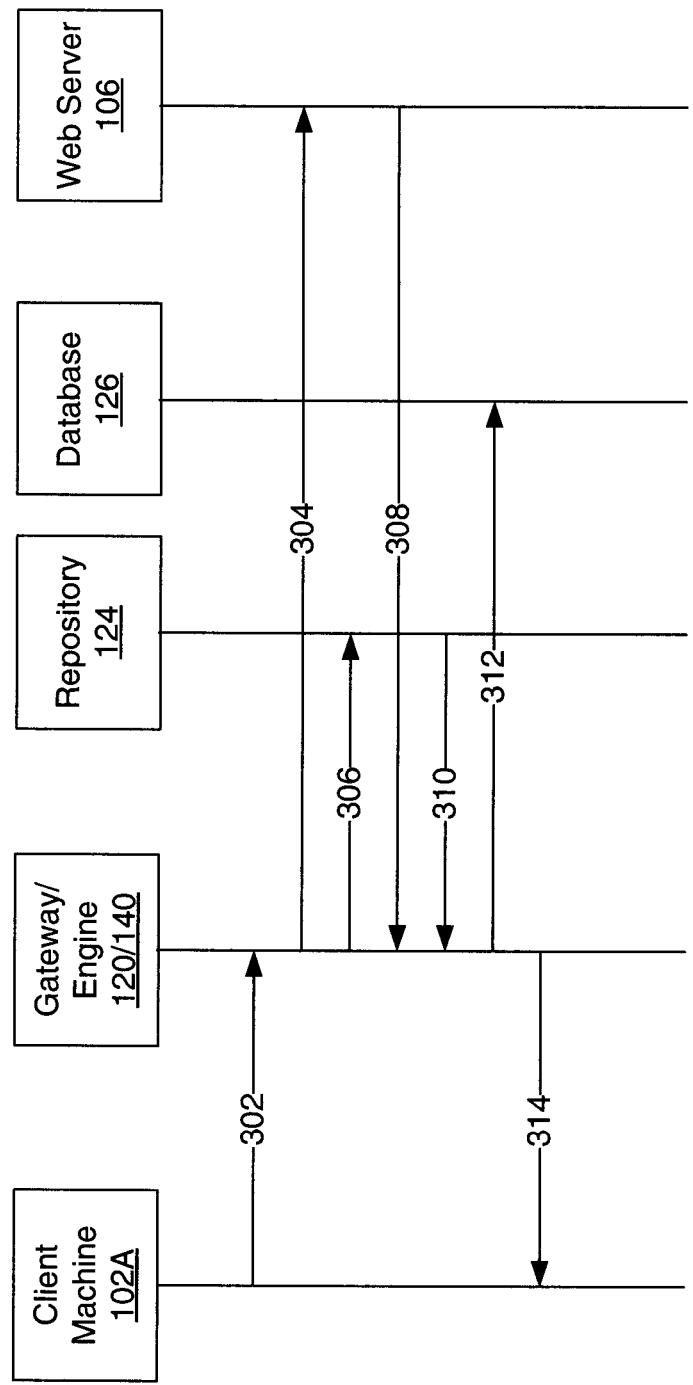
FIG. 3 illustrates a flow of interactions among components of the system of FIG. 1.

FIG. 3 is a flowchart illustrating operations/interactions for transcoding a web page (e.g. 110) from web site 104 for client machine 102A, providing an example of the interaction among the gateway and schema server 120, client machine 102A and the web site 104. Client machine 102A makes a request 302 to server 120, acting as a proxy, for a specific web page (e.g. 110) from a web site having a specific domain (URL). The gateway and schema server engine 140 receives the request and makes a corresponding request 304 as a proxy to the web site's web server 106 for the specified page, receiving 308 the web page code (e.g. 110) into the engine's (140) memory. The web page code is treated as an ASCII (plain text) file. It typically does not include objects referenced by the code such as images, video, audio, further web pages, etc. that are typically subsequently retrieved and inserted at the time of rendering a web page by a browser.

The engine 140 (for example, in parallel or without waiting for a response from server 106) makes a request 306 to the signature repository 124 for the signature schema document 122 for the web site, which request may use the domain in the URL as an identifier for obtaining the document 122. The engine 140 receives 310 the schema. The engine 140 does not render the web page 110 per se but instead uses the instructions in the signature schema document 122 to extract the subset of data from the web page 110 for transcoding. In the present embodiment signature schema 122 is configured to transcode the web page 110 in accordance with the specific characteristics of the requesting client device 102A, having knowledge of display 224 capabilities—such as screen size, resolution, and other parameters—useful in determining the way in which the transcoded data is to be displayed on the machine 102A.

Optionally, the web page 110 or extracted data or both can be stored 312 in database 126. Engine 140 transmits 314 the transcoded data 130 that has been extracted and transcoded to a target format from web page 110, in accordance with the schema 122, to the requesting client machine 102A. As noted above, transcoded data 130 may comprise transcoded navigational data for menu application 82 and informational content data (e.g. a list of products and related information from a web page) for displaying by browser application 86.

Signature schemas are pre-defined documents, and may be eXtensible Markup Language (XML) documents utilizing an SQL-like query language, to incorporate instructions and data with which to intelligently extract the data from web pages (which web pages are typically coded in HTML, DHTML, XHTML, XML, RSS, JavaScript, etc). This extracted data may be transcoded and provided to client machines 102, or used to dynamically generate a relational database (e.g. 126) or both. Each signature schema incorporates an understanding of a particular web site's data including relationships among the various data (e.g. among its primary informational content found in the body of its web pages as well as among such content and associated navigational data (e.g. web page links) that govern the data in the page). As described further herein below, prior knowledge of the web page code including specific identifiers, tags and text (i.e. strings) used within the code (sometimes referred to as "signatures" herein), may be used to define instructions to identify portions of the code of interest and to extract specific data.

As a further feature, transcoding may be configured to provide continuity of browsing/transactional/session experience enabling a user to switch client machines (e.g. starting with client machine 102A and switching to machine 102B (or vice-versa)). A user may be enabled to start an interaction with a web site and have displayed data (published content and navigational data) on the client machine 102A. The browsing session may then be continued on a second client machine (102B) while retaining the transcoding as provided to the first client machine. For example, a user on a desktop can continue to browse the published content and navigational data of the web site as previously experienced on a mobile device, using only a portion of the desktop screen (for example) for data display.

In accordance with the present embodiment, a signature schema document may be defined for all the pages of a particular web site. Large data-driven web sites (e.g. 104) don't maintain thousands of individual web pages per se. The sites typically adopt a few page family templates 108 and dynamically populate these with pertinent content from database 112 comprising information (e.g. weather, stock data, news, sports, shopping/product data, patent data, trade-mark data etc.) as applicable when a client requests a particular page. Each template represents a family of pages having objects and attributes. Below are representative example page family templates and their objects and attributes for a web site offering news and an e-commerce web site offering products for sale electronically:

Example 1

News Site

Family: List Page
Objects: lists a selection of news stories
Attributes: Title, abstract and date
Family: Detail page
Objects: lists a single news story (and optionally other related stories)
Attributes: Journalist, City, Date, Title, Full Story, Image

Example 2

E-Commerce Site

Family: List Page
Objects: lists a selection of products
Attributes: Image, Item Name, Price, Sale Price
Family: Search Page (a specific kind of list page)
Objects: Similar to a list page
Attributes: Similar to a list page Each family of pages (the family template) can be identified by a "signature" or unique set of one or more features that automatically identifies a given page on a web site as part of the family and differentiates that family from another family of pages. Similarly each object and attribute field of interest can be identified with its respective unique signature within a family of pages. A signature schema document typically comprise numerous pieces of information (commands), for example, information that instructs the engine 140 for:

identifying all page families;
identifying and extracting a subset of data (i.e. desired objects and attributes) for each page family;
capturing the (implicit or explicit) relationships between the objects and attributes; and
transcoding the data.

A signature schema document may also be configured to enable special functionality for the target web site including searching, logging in a user, purchasing items, etc.

In accordance with a present embodiment, the structure and syntax of a representative signature schema document for a representative e-commerce site eshop.ca is shown and described. Engine 140 may be configured to receive web page code comprising text data and search through the text in accordance with the schema document instructions that provide SQL-query like language instructions. Engine 140 maintains a pointer within the text as it moves through the web page code performing various actions, as described below, in accordance with the schema instructions. Table 1 illustrates a snippet of a representative signature schema:

TABLE 1

XML Signature Schema Snippet for E-Shop.ca

```
1   <?xml version="1.0" encoding="ISO-8859-1" ?>
2   <site>
3       <version major="1" minor="2"/>
4       <url location="http://www.eshop.ca" key="eshop.ca" name="E-Shop" />
5       <advanced>
6
7           <index_link value="http://www.eshop.ca/home.asp" />
8       </advanced>
9       <page_type>
10          <lookup type="pex" action="locate_string" name=
                "list_elements" id="mylist_1" ref="Compare products"
                alt1="Sort products" />
11          <lookup type="pex" action="locate_string" name="item_elements"
                id="myitem_1" ref=""product-details"" />
12          <lookup type="pex" action="locate_string" name="menu_elements"
                id="mymenu_2" ref="anc-lhsnav-subItem" />
13          <lookup type="pex" action="locate_string" name="menu_elements"
                id="mymenu_1" ref="product-table" />
14          <lookup type="pex" action="locate_string" name="item_elements"
                id="myitem_1" ref="*" />
15      </page_type>
16      <list_elements id="mylist_1">
    ...
17      </list_elements>
    ...
18      <item_elements id="myitem_1">
19          <actions>
20              <lookup type="pex" action="move_ptr" ref="</head>" />
21          </actions>
22          <element>
23              <lookup type="pex" action="get_string" name="image"
                    ref="largeimageref" location="after" start="<img
                    src="" end=""" />
24              <lookup type="pex" action="get_string" name="title" ref="product-
                    details-prd-title" location="after" start="<span"
                    end="</span>" include_sz="1" strip_tags="1" />
25              <lookup type="pex" action="get_string" name="price"
                    ref="our price:" location="after" start="<td"
                    end="</td>" include_sz="1" strip_tags="1" />
26              <lookup type="pex" action="get_string" name="sale_price"
                    ref="sale price:" location="after" start="<td"
                    end="</td>" include_sz="1" strip_tags="1"
                    tolerance="1" />
27              <lookup type="pex" action="get_string" name="description"
                    ref="detailbox-text" location ="middle" start="<p"
                    end="</p>" include_sz="1" strip_tags="1" />
28          </element>
29      </item_elements>
    ...
```

In the XML code snippet of Table 1, instructions at line 4 are for verifying that the web page under consideration and the signature schema relate to the same web site/domain—eshop.ca. Instructions at lines 9-15 are for determining the particular page family to which the web page under consideration belongs. A respective signature that defines the particular page family has been previously identified for use to distinguish the page. The engine 140 processes the  tag by registering the identification strings for each page family. When a web page is obtained by the engine as input, the engine may be able to identify the page family by its unique string ref="" and the command provides the related tag within the signature schema document where further instructions for the particular web pages are found:

action="locate_string": command to check for the existence of a string.

name="": identifies the type of page family for each identified family.

id="": assigns an id to the page family that is used across the signature schema document.

For example, at line 10, the instructions identify a web page using the alternative signatures "Compare products" or "Sort Products". Web pages with these strings are of the same family type. The instructions at line 10 provide a reference tag to further instructions for this family, providing a link to instructions for the list_elements page family with and ID of mylist_1 (see lines 16-17). Similarly the other lookup instructions provide references to the specific instructions within the signature schema document for handling a web page of each web page family. Representative instructions for some of the web page families are provided in Table 1, for example, at lines 16-17 and 18-29 with others omitted for brevity.

With reference to the extraction instructions for one of the web page families (i.e. item_elements id="myitem_1") at lines 18-29, the instruction at line 20 advances the scan pointer within the text file of the web page code to a beginning limit of a region of interest indicated by a signature reference. This establishes an upper limit for review within the text file. Though not shown in this table, an end limit may be defined as well (See Table 4). Further such instructions at lines 22-28 may comprise commands to locate subset of data using "signatures" such as string identifiers that uniquely identify the data within the region of interest. In the present example the instructions locate and extract a plurality of elements, namely, product image, title, price, sale price and description for a product of the item web page family. For example, instructions at line 23 extract a string in between the first "<img src=""" and """" that appears after next appearance of "largeimageref". The string returned is the path (relative URL at web site eshop.ca) to the product image. By advancing a search scan pointer within the web code to a particular location, references before that location can be skipped when searching. Any prior instances of a signature string such as "largeimageref" may be ignored. In this way, otherwise ambiguous signature references can be avoided.

The example in Table 1 shows at least some of the instructions (e.g. lines 23-27) including one or more directional references relative to the signatures to locate and extract the subset of data. For example, directional references such as "before" or "after" command the engine to extract the data that is in a relative position in the web page before or after the signature string (i.e. ref=). Moreover, such instructions may further include at least one of a start reference or an end reference further pinpointing the location of the data in accordance with that direction. Additional directional reference information is discussed herein with reference to code snippets in other Tables and the discussion of an embodiment of signature transcoding engine syntax presented below.

The example within Table 1 demonstrates the extraction of data and the establishment of relationships between objects and elements within a same page of a web site. However, signature schema documents may further capture relevant attributes of an object across pages. For example, a user of client machine 102A may click through a number of web pages in eshop.ca to get to a specific product page (e.g. Department→Product Category→Product Sub-Category→Specific Product, such as TV & Video>19"-21" TVs>LCD TVs>BrandX Product. The navigational hierarchy representing a categorization may be captured and associated to the extracted objects and there elements.

For brevity, certain instructions were omitted from Table 1. Tables 2-4 provide representative instructions for further web page families for e-shop.ca that may be read with Table 1. Table 2 below provides representative instructions, e.g. for lines 16 and 17 of Table 1, including instructions for a web page family related to a list of items/products for sale. Whereas instructions at lines 22-28 provided product data extraction instructions for a web page family showing a single item (i.e. product), the instructions of Table 2 provide additional instructions that repeat product data extractions for each product in the list.

TABLE 2

XML Signature Schema Snippet for Product List Web Page Family of E-Shop.ca

```
1    <list_elements id="mylist_1">
2        <paging>
3            <page_variable value="page" />
4            <page_start value="0" />
5            <lookup type="pex" action="get_string" name="link"
                    ref="Next " location="before" start="<a
                    class=" end="</a>" include_sz="1" strip_tags="1" />
6        </paging>
7        <actions>
8            <lookup type="pex" action="move_ptr" ref="Sort or compare
                    products" ref_alt_1="Sort products" />
9        </actions>
10       <element>
11           <lookup type="pex" action="get_string" name="link" ref="thumbnail"
                    location="before" start="<ahref=""" end=""">" />
12           <lookup type="pex" action="get_string" name="image"
                    ref="thumbnail" location="middle" start="""
                    end=""" />
13           <lookup type="pex" action="get_string" name="title"
                    ref="class="tx-strong-dgrey""
```

TABLE 2-continued

XML Signature Schema Snippet for Product List Web Page Family of E-Shop.ca

```
                    location="after" start="<a href=" end="</a>"
                    include_sz="1" strip_tags="1" />
14            <lookup type="pex" action="get_string" name="price" ref="pricepill/"
                    location="after" start="/" repeat_start="1" end=".gif"
                    tolerance="1" />
15            <lookup type="pex" action="move_ptr" ref="pricepill/" />
16        </element>
17   </list_elements>
```

If the engine 140 identifies that the page is of the "mylist_1" family, the engine determines the location in the signature schema document that contains the signature for the objects and elements of that family and applies the instructions therefor. A product list at e-shop.ca may span multiple web pages. Instructions at lines 2-6 of Table 2 find the number of pages and generate the links for each of the pages. Instructions at lines 7-9 (action tag) advance the search scan pointer to the region of web page code that may be of interest (i.e. in this case, the start of the list). In this way, a local signature reference can be used and any earlier ambiguous references skipped. Skipping to the local region of interest may also make the specification of the signature reference less complicated.

Taking advantage of inherent repeated patterns in the web page code, instructions at lines 10-16 (elements tag) of Table 2 provide product data extraction instructions that may be repeated for each product in the list. The engine 140 may be provided with commands to scan for each data element of interest using a signature reference e.g. ref="", an action, one or more positional instruction(s) to further identify the data within the text of the web page code, and any additional text data manipulation instructions to extract the data (e.g. to remove HTML formatting characters or add characters). The instruction at line 15 moves the scan pointer to the end of the object (in this example a product in a list of products) to ready the instructions for application against the next object (product) in the list.

More particularly:
lookup type="pex": string lookup
action="get_string": returns a value back that is the desired element of the object.
name="link": the object element, in this case the link to the product page
ref="thumbnail": the reference string that identifies where to find the value of the link
location="before": the value of the link is before the ref string
start="<a href="": look for the ref string after this value
end="">": look for the ref string before this value.

TABLE 3

E-Shop Search Family Signature Schema Snippet

```
1  <search_elements id="mysearch_1">
2     <settings>
3         <search_path value="http://www.eshop.ca/search/search.asp/>
4         <search_variable value="keyword" />
5     </settings>
6     <paging>
7         <page_variable value="page" />
8         <page_start value="0" />
9         <lookup type="pex" action="get_string" name="link" ref="Next "
                 location="before" start="<a href=" repeat_start="1"
                 end="</a>" include_sz="1" strip_tags="1" />
10    </paging>
11    <actions>
12        <lookup type="pex" action="move_ptr" ref="bg-compare-hero" />
13    </actions>
14    <element>
15        <lookup type="pex" action="get_string" name="link" ref=">"
                 location="after" start="<a href="" end="">" />
16        <lookup type="pex" action="get_string" name="image" ref="<a href"
                 location="after" start="<img src="" end=""" />
17        <lookup type="pex" action="get_string" name="title"
                 ref="class="tx-strong-dgrey"" location="after"
                 start="<a href=" end="</a>" include_sz="1" strip_tags="1" />
18        <lookup type="pex" action="move_ptr" ref="bg-compare-hero" />
19    </element>
20 </search_elements>
```

If the engine 140 has identified that the page is of the "mysearch_1" family the engine applies the portion of the signature schema document that contains the signature for the objects and elements of that family, shown above in Table 3.
<settings> . . . </settings>: Contains any web page specific manual overrides such as excluding certain menu items, customization, modification of a menu that may be desired. In this example, as per line 3 a value of form variable "keyword" will be posted to "http://www.eshop.ca/search/search.asp".
<paging> . . . </paging>: Manages paging for the search pages.

\<actions\>...\</actions\>: Instruct the engine to move the scan pointer to the string "bg-compare-hero" (line 12 of Table 3) and start looking for elements from there.
\<element\>...\</element\>: Contains lookup instructions for each object element as previously described.

TABLE 4

E-shop Menu Family Signature Schema Snippet

```
1  <menu_elements id="mymenu_1">
2      <settings>
3          <black_list value="Site Index##External Link" />
4      </settings>
5      <actions>
6          <lookup type="pex" action="move_ptr" ref="bg-lhsnav-title" />
7          <lookup type="pex" action="end_ptr" ref="</table>" />
8      </actions>
9      <element>
10         <lookup type="pex" action="get_string" name="link" ref="<li>"
                  location="after" start="<a href=""" end=""" />
11         <lookup type="pex" action="get_string" name="title" ref="<li>"
                  location="after" start="<a href=""" end="</a>"
                  include_sz="1" strip_tags="1" />
12         <lookup type="pex" action="move_ptr" ref="</li>"/>
13     </element>
14 </menu_elements>
```

If the engine 140 has identified that it is looking for a menu on a page that contains the menu style of the "mymenu_1" family, the engine applies the portion of the signature schema document that contains the signature for the objects and elements of that family, shown above in Table 4.

\<settings\>...\</settings\>: Contains any page specific manual overrides such as exclude list, customization, modification, personalization, etc. In this example, as per line 3, any result that matches "Site Index", "External Link" are excluded but partial matches are also possible by using wild card strings.

\<action\>...\</action\>: Lines 6-7 of Table 4 sets the start and end limits to instruct the engine 140 where to look for menu items.

\<element\>...\</element\>: Contains lookup instructions for each object element as previously described. In this example, lines 10 and 11 of Table 4, an element in 'mymenu_1' (each individual menu entry of web page) contains link and title as its properties. Line 12 instructs the engine to move the pointer to "\</li\>" to get ready to loop through and extract the next menu item with the same elements, taking advantage of the repeated patterns within the text of the web page code.

Though the example described relates to extracting informational content for an e-commerce oriented site, no limitation should be applied. Similar instructions may be defined for other types of sites, for pages which permit a user to input information and for navigational data extraction.

Signature schema document 122 may further comprise transcoding instructions (not shown) for use by engine 140 to express the extracted subset of data in a target format (e.g. a format of HTML, XML, script etc.) for use by the requesting client machine 102. For example, the transcoding instructions may define a web page for displaying the extracted data in browser application 86 that is suitable for display on the client device 102. The formatting rules can be system and/or user defined and can include parameters such as but not limited to: object positioning, object colour, object size, object shape, object font/image characteristics, background style, and navigational item display (e.g. in a menu as described above) or for display with the content in the generated page on the client screen. Browser application 86 (e.g. of machine 102A) may be configured for using a markup language (e.g. cHTML) or other code format that is not identical to the code provided by web page 110. Alternatively, transcoding instructions may be defined to express the extracted subset of data in XML or another code format such as for use by a different client application or plug-in to a client application such as menu application 82 or another application (not shown) on client machine 102.

Signature schema documents may be prepared (i.e. coded) using a computing device such as computing device 128. Computing device 128 may be any suitable desktop or laptop device capable of coding documents (which may be but need not be XML-type documents) and may be configured to automate or semi-automate coding of such documents.

Computing device 128 may be coupled to web site 104 to retrieve web pages from the site for reviewing to prepare the custom signature schema document for the site. Computing device 128 may be configured to automatically review the web page code and apply heuristics or other techniques (e.g. spatial analysis) to determine probable content of interest (i.e. subset of data) and generate code to extract the subset of data. For example, primary content of interest tends to be located toward the centre of the web page. In another embodiment, the computing device 128 may facilitate a user coding signature schema to manually assist with the analysis of the web page and identification of subset of data and the generation of the instructions. Computing device 128 may be further coupled to repository 124 to provide (e.g. up-load or publish) coded signature schema documents for use by server 120.

Automatic Generation of Signature Schema 122

Figure 8A:
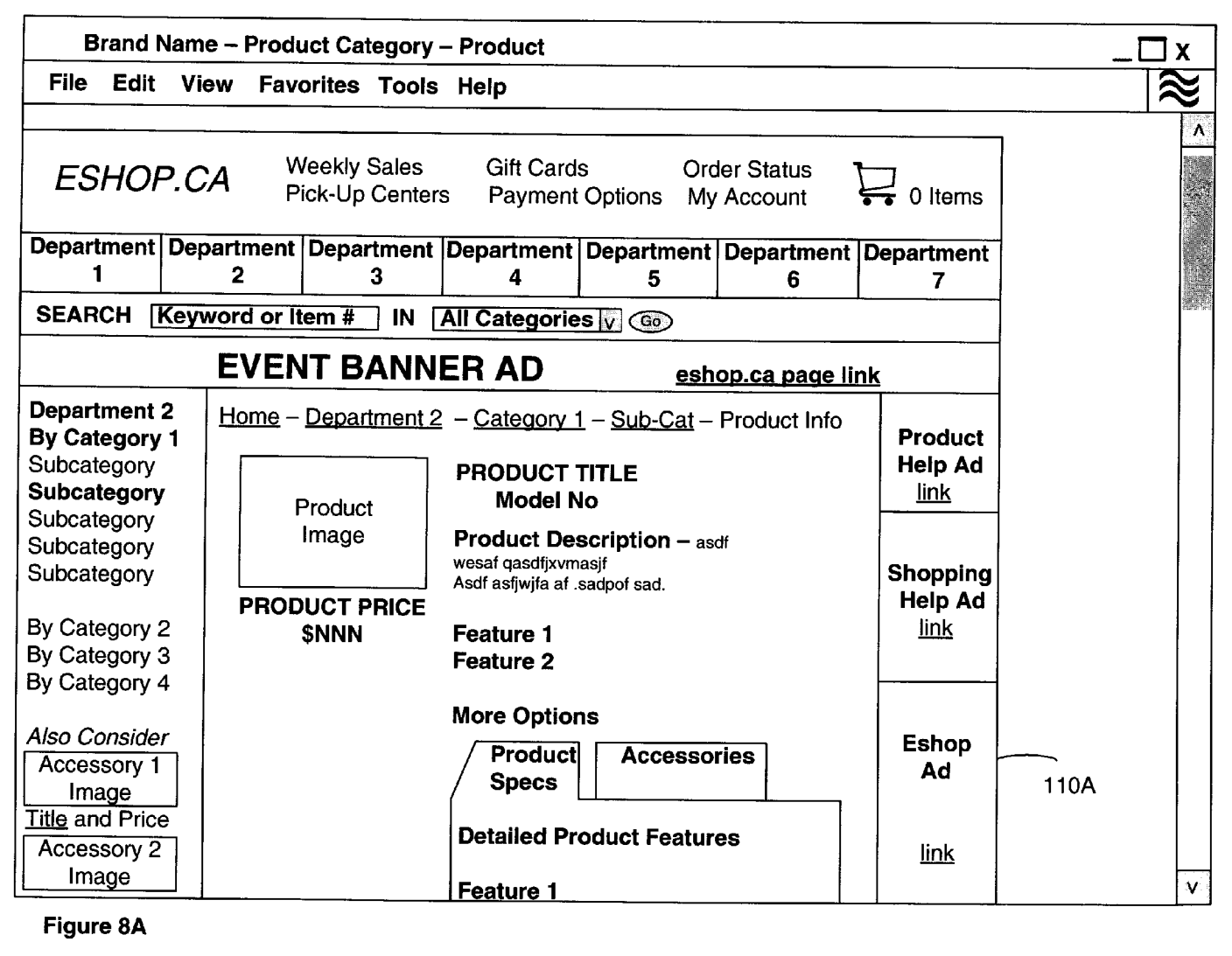
Figure 8B:
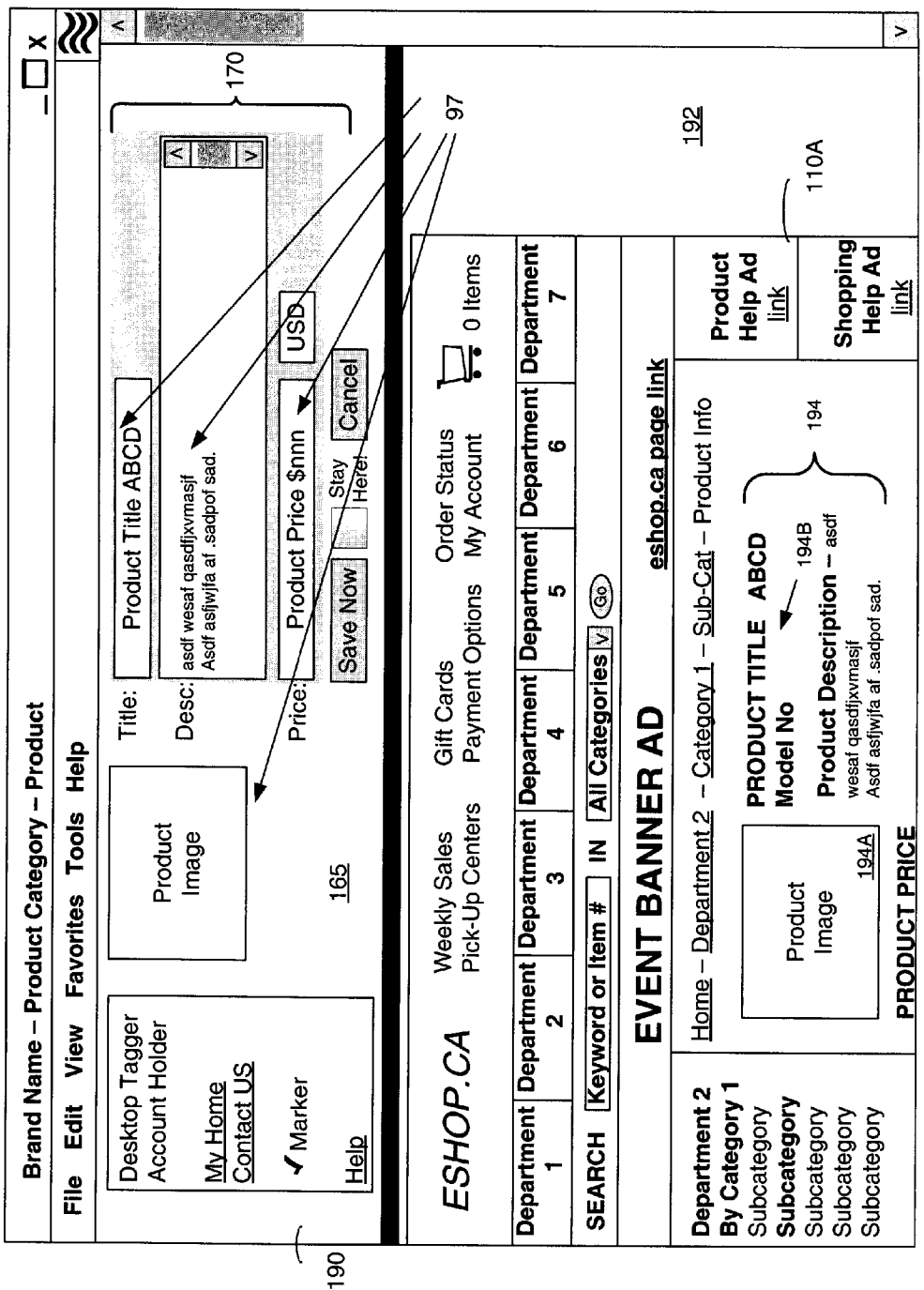
FIG. 8B illustrates an exemplary view of a user interface of a desktop tagging tool for identifying a subset of data on the example web page of FIG. 8A.

Referring to FIGS. 1 and 8B, in one embodiment, the computing device 128 of system 100 comprises an automatic signature generation tool 150 for preparing a custom signature schema document for web pages of a web site. Computing device 128 may further comprise a desktop tagging tool 160 having a graphical user interface 165, which may be adapted to cooperate with a web browser application for assisting a user to identify the subset of data (e.g. product title, image, description and price data) in a web browser window 190. In a present embodiment, user interface 165 may comprise a portion of the window while the remaining portion 192 displays the rendered web page 110A for which a signature schema 122 is to be constructed. User interface 165 may present a form 170 showing the subset of data (fields and values therefor) where candidate data values 97 from data 194 of the web page 110A populates the form 170. User interface 165 may facilitate confirming or amend the candidate data values. For example, data replacing the candidate data 97 may be selected and captured (not shown) from the rendered web page 110A through "drag and drop" or highlighting/copying user gestures.

User interface 165 may be predefined to present candidate subset of data 97 (i.e. for particular subset of data types that are expected to be found on web pages for such web sites of a similar genre). That is, a user interface 165 for an e-commerce web site selling products may be defined to present "product title", "image", "price", etc. If a particular candidate value (i.e. as presented on form 170) was incorrect and not representing correct subset of data from the web page 110A, for example, product image 194A, title 194B, etc., such may be selected and dropped or copied into form 170 of interface 165. Optionally, the interface may permit the user to add data types (fields and field values) to the presented data. In association with these actions, tool 160 examines the associated HTML source code/tags of the rendered web page for capturing this data. Desktop tagging may be useful to assist with the identification of the subset of data within the web page code so that signatures therefor within the web page code of similar pages may be determined for defining the signature schema documents.

Although the desktop tagging tool 160 and the automatic signature generation tool 150 are described in relation to computing device 128, it will be understood that any one of the client machines 102 may be configured to comprise the tools 150 and 160. Further, it will be understood that the exemplary operation of the automatic signature tool 150 may be implemented similarly on the client machines 102. Similarly, the flow of interactions may apply similarly for one or both of the computing device 128 or the client machine 102.

Although signature schema documents 122 may be manually coded, these activities may be time consuming and subject to human error. Therefore, by providing an automatic signature tool 150 to automate coding of signature schema, transcoded web pages (e.g. 130, 132), and thus transcoded web sites, may be readied for use faster and more reliably.

Figure 6:
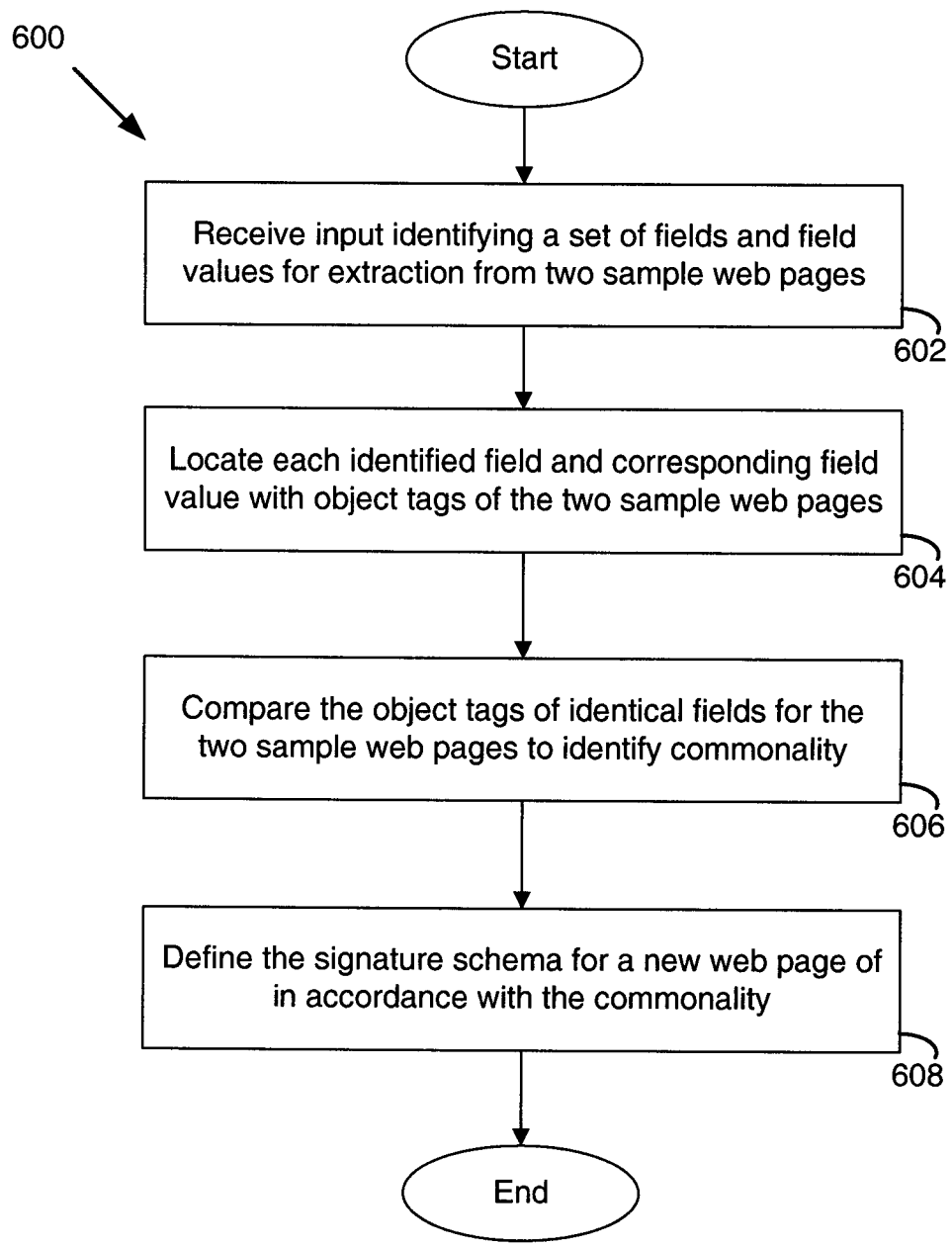
FIG. 6 illustrates exemplary operations of an automatic signature creation tool of the system of FIG. 1.

Referring to FIG. 6 shown are exemplary operations 600 of the automatic signature generation tool 150. A detailed example of two sample web pages used to define a signature schema will be presented below. At 602, the automatic signature generation tool 150 receives an input identifying the subset of data that is to be located and extracted, that is, for which signatures and instructions are desired. Tool 150 receives an input identifying a set of fields and corresponding field values for extraction from at least two sample web pages of a web page family. The fields and field values have also been referred to as elements herein. That is, the fields may refer to the categories or attributes by which an object (such as an item for sale) may be defined. For example a product object such as a camera may have the following fields: image, title, price, description. The values for each of the fields related to the camera may be referred to as field values. The field value for the title field may include "BrandX 7.2 MP Digital Camera".

The input identifying the fields and field values for extraction as defined in 602, may be provided by: a manual review of the web page to identify desired fields (e.g. locating the desired image within object tags of a web page) and to indicate the content type of various tags in the web page (e.g. navigation, title, price, image, item description, etc.). Alternatively, the input fields and field values of step 602 may be semi-automated using the desktop tagging tool 160 to highlight portions on the web page and therefore visually select which content data corresponds to what meaning (e.g. to select the elements on a page linked to a field). Further alternately, the desktop tagging tool 160 may be used to automatically populate fields and estimated values for the fields and to allow a user to confirm/correct estimated fields (e.g. by using heuristics or other rules automatically applied in combination with pre-defined locations of fields (e.g. confidence intervals) to web pages to identify likely subset of data) provided by tagging tool 160 or other module (not shown).

At 604, each identified field and corresponding field value is located within object tags of each of the at least two sample web pages. For example, if for the first sample web page, the input received identifies an image field having the value "product_image.gif", then this value is first located within an object tag of the first web page. For example, the object tag may be: <img src="product_image.gif"> and it is the second image object tag (e.g. a second instance of the <img tag) in the code of the web page that contains this object tag. The received input further identifies that for the second web page, the identical field type (e.g. image field) has a value of "sample_image.gif". It is determined that the second image object tag in the code of the web page is associated with the identified image field (e.g. the object tag may be <img src="sample_image.gif">).

At 606, the automatic signature generation tool 150 compares the object tags of identical fields (e.g. image field) between the two sample web pages to identify a commonality between the object tags for the identical fields (such as common location, string identifiers, attribute type, and other patterns (i.e. a pattern comprising characters that describe a set of strings that can uniquely identify a field value)) within the plain text (ASCII) web page code. A pattern may include "string1"*"string2" where * represent 0 or more characters between the characters of "string1" and "string 2".

In the above example, the commonality between the two identified object tags may be that the object tag was the second instance of the "img" attribute within the code of each web page; that the object for the two sample web pages starts with 'src="' and that '"' ends the string that provides the field value for each object. For example, the object tag of the first web page provided the string "product_image.gif". Further, the object tags corresponding to each web page and having the identical image field type may be identified by the attribute "<img".

At 608, automatic signature generation tool 150 uses the commonality between object tags of identical fields of the two sample web pages to define instructions to locate and extract the subset of data, which instructions comprise a portion of the signature schema 122 for web pages of the same family type. Operations 600 may be repeated for each of the identified fields and field values (elements) to determine the commonality and patterns between the two sample web pages, in turn defining signatures and instructions with which to define at least a portion of signature schema 122. Further, operations 600 may be repeated for other web pages of other family types in the web site to generate the instructions to code other respective portions of schema 122.

An example of the operations 602, 604, 606, and 608 will now be described with reference to two illustrative sample web pages (and their illustrative HTML code in Table 6). As described earlier, pre-identified fields and field values indicating the subset of data to be located and extracted from the web page code for this web page family are provided (Table 5) for each of the sample web pages (for operations 602). As also described, the pre-defined fields may either be identified manually by the user or using the desktop tagging tool 160 including estimated locations of the fields to generate the desired fields and field values.

TABLE 5

Example Fields and Field Values of Two Sample Web Pages

Item1

| | |
|---|---|
| Image | Product_image.gif |
| Title | Product Title |
| Price | $79.99 |
| List Price | $99.99 |
| Description | This is a description for Product title made by Product Manufacturer |

Item2

| | |
|---|---|
| Image | Sample_image.gif |
| Title | Sample Title |
| Price | $99.99 |
| List Price | $109.33 |
| Description | This is a description for Sample title made by Sample Manufacturer |

TABLE 6

Example HTML Web Pages Document of the Two Sample Web

Item1.html
<html>
<head></head>
<body>
<img src="company_logo.gif" class="image" />
<div class="product">
<h1>Product title</h1>
<h2>Product Manufacturer</h2>
<img src="product_image.gif" />
<br>
List Price: <strong> $99.99 </strong>
<br />
<br>
Our Price: <strong> $79.99 </strong>
<br />
<p>
This is a description for Product title made by Product Manufacturer
</p>
</div>
</body>
</html>
Item2.html
<html>
<head></head>
<body>
<img src="company_logo.gif" class="image" />
<p>
disclaimer
</p>
<div class="product">
<h1>Sample title</h1>
<h2>Sample Manufacturer</h2>
<img src="sample_image.gif" />
<br>
List Price: <strong> $109.33 </strong>
<br />
<br>
Our Price: <strong> $99.99 </strong>
<br />
<p>
This is a description for Sample title made by Sample Manufacturer
</p>
</div>
</body>
</html>

As noted, automatic signature generation tool 150 repeats operations 602-608 for each of the input fields (e.g. image, price, title, description) to define a commonality between the web page code (e.g. tags etc.) used to describe each of the respective fields and thereby define the signature schema 122 for that field.

Step 1—Identify the Image Field and Field Value in the Sample Web Pages

First, the automatic signature generation tool 150 examines the web page code of Item1 for the identified image field <img src="product_image.gif"/>. Tool 150 may initially identify "src" as an attribute corresponding to the image field and scan the source (HTML document) of the Item1 web page for src="product_image.gif". It does find a match (as it ought to since the field was previously selected from this code) and the location thereof. It then scans item2 but no match is found in item2. Next the automatic signature generation tool looks at "<img" within the source document of item1. It determines that it is the second match (corresponding to the "img" attribute). Once the object tag corresponding to the image field and field value has been located within item1, the automatic signature generation tool 150 examines Item2 for the image field having value of sample_image.gif. When looking at Item2, the second object tag having the image attribute also provides the object that contains the image. Now that a matching object corresponding to the same field type (e.g. image) has been found, a similar heuristic is used by the automatic signature generation tool 150 to locate the result from within the object. If the object is a text node, the process is complete. Text nodes are easily distinguished by their respective tags in the code. Otherwise, the start and end of the object corresponding to the image field may need to be located. Using pattern recognition techniques, it is found that the pattern 'src="' starts the string and that '"' ends the string. Therefore the following entry may be added to the signature schema 122 for defining the image field.

<lookup type="pex" action="get_string" name="image" ref="<img " repeat_ref="1" start=" src="" end=""" />

Step 2—Identify the Title Field and Field Value for Each Sample Web Page

From Item1 the object <h1>Product title</h1> is selected by the automatic signature generation tool 150 based on the identified fields to review. Tool 150 identifies that it is a text node within the code and looks to its parent to identify uniqueness. There are no attributes for the parent <h1>. Next the automatic signature generation tool 150 looks at "<h1" within Item1. It determines that it is the only match. When looking at Item2, there is only one match, and the matching object tag contains the title. Now that the automatic signature generation tool 150 has obtained the matching object for the title field in each of the sample web pages, a similar heuristic is applied to locate the result from within the object. Since the object is a text node, the process is complete. Therefore the following entry may be added to the signature schema 122 for defining the title field of a web page.

<lookup type="pex" action="get_string" name="title" ref="<h1" start=">" end="<"/>

Step 3—Identify the Price Field and Field Value for Each Sample Web Page

From Item1 the object <strong> $79.99</strong> is selected by the automatic signature generation tool 150. There are no attributes to be checked for this element. Next the element looks at "<strong" within Item1. It determines that it is the second match that contains the desired price ($79.99). When looking at Item2, the second strong tag also provides the object that contains the price. Since the object is a text node, the process is complete. Therefore the following entry may be added to the signature schema 122 for defining the Price field of a web page:

```
<lookup type="pex" action="get_string" name="price" ref="<strong"
repeat_ref="1" start=">" end="<" />
```

Step 4—Identify the List Price and the List Price Value for Each Sample Web Page From Item1, the object <strong> $99.99</strong> is selected by the automatic signature generation tool 150. There are no attributes to be checked for this element. Next the signature generation tool 150 looks at "<strong" within Item1. It determines that it is the first match that corresponds to the selected object that contains the desired list price field and value. When looking at Item2, the first strong tag also provides the object that contains the list price field and value. Since the object is a text node, the process is complete. Therefore the following entry would be added to the signature schema 122 for defining the List Price field of a web page:
<lookup type="pex" action="get_string" name="price" ref="<strong" start=">" end="<"/>

Step 5—Identify the Description and the Text Value for the Description Field for Each Sample Web Page From Item1 the next identified field for automatic signature generation tool 150 is object "<p> provides a description for Sample title made by Sample Manufacturer </p>". This object represents the pre-identified Description field and field value of Item1. There are no attributes to be checked for this object. Next the signature generation tool 150 looks at "<p" within Item1. It determines that it is the first match that contains the desired description field and field value. When looking at Item2, the first <p tag does not provide the object that contains the desired description (e.g. "This is a description for Sample title made by Sample Manufacturer"). The parent object <div class="product"> is selected next by the automatic signature generation tool. It identifies the attribute class="product", and scans Item1, and determines that it is the only match. The <p tag is processed again, limiting its search to the parent. The <p tag is identified as the first instance within the parent in Item1. Next the same process is performed on Item2. First the attribute class="product" is located. The first <p tag that is a child of the object containing class="product" is found. The <p object also contains the desired description (e.g. This is a description for Sample title made by Sample Manufacturer". Since the object is a text node, the process is complete. Therefore the following entry would be added to the signature schema 122 for defining the description of a web page:

```
<lookup type="pex" action="get_string" name="description"
ref="class="product"" start="<p>" end="<" />
```

Accordingly, as illustrated in Step 5 of the example above, in one embodiment, the automatic signature generation tool 150 examines the HTML document (or other format of web page) and constructs a programmatic data structure to model a hierarchy of the tags. The resulting structure may be a tree, which defines the parent, siblings and children of each object. The operations may identify the key objects that contain the data required for the signature schema document 122. Once a particular object is identified as being a desired data field (i.e. is one of the fields in Table 5), the uniqueness of the object may be identified by examining its properties (for example class, style, id) within the structure. If the properties of the object are not unique, then the task to identify the uniqueness for the object would expand to its parent, siblings and children. For example, if the object is a text node of the tree (or other hierarchical structure), the object may use the properties of its parent to assist with the identification of is uniqueness for expression as a signature. The operations may expand in all directions uniformly (i.e. examine parent, then previous sibling, then next sibling, then first child). The properties of each of these items may also be merged with the desired object to build out the uniqueness. This process would then be repeated on the parent, then the previous sibling, etc., until a unique identifier was found. Once a unique identifier was found, an expression would be created for the signature.

Accordingly, in view of the above, the automatic signature generation tool 150 provided by the computing device 128 provides the signature schema 122 for a new web page family using at least two sample web pages. As illustrated in steps 604 and 606, the tool 150 compares two or more delimiters (pertaining to a common schema of the definition of the pages) from each of the sample web pages in order to identify common uses of the delimiters (and their contents). Once identified as a match, the corresponding object, for example, is placed in the hierarchical structure (or other ordered list, etc.) for defining the signature schema 122.

It is recognized that the hierarchy can link entities either directly or indirectly, and either vertically or horizontally. The only direct links in a hierarchy, insofar as they are hierarchical, can be to the entities' immediate superior or to the entities' subordinates, although a system that is largely hierarchical can also incorporate other organizational patterns. Indirect hierarchical links can extend "vertically" upwards or downwards via multiple links in the same direction. Traveling up the hierarchy to find a common direct or indirect superior, and then down again can nevertheless "horizontally" link all parts of the hierarchy, which are not vertically linked to one another. Further, the structure may also be a list implemented using arrays or linked/indexed lists of some sort. The structure may have certain properties associated with arrays and linked lists.

Further, it is recognized that the structure would be represented in the signature file 122 as the entries or instructions as noted above. It is recognized that a user of the device 128 could manually amend or otherwise review the automatically generated signature file 122, as desired.

It will be apparent to a person of ordinary skill in the art that as a web site may be re-designed or otherwise changed such that the code of one or more web page families may be changed or a family added, an existing signature schema may require re-coding to account for the change/addition, as applicable.

Desktop Tagging Tool 160 and Extraction of Subset of Data from a Selected Web Page Referring again to FIG. 1, the desktop tagging tool 160 allows assisted recognition of web page contents to identify and extract a subset of data from a selected web page (e.g. 110A as illustrated in FIG. 8A). The identified subset of data may be used for creating the signature schema 122 for providing transcoded web pages (as described herein). As will be understood, the identified subset of data may depend upon the use for the data. For example, in an e-commerce web site, it may be desirable to extract/identify e-commerce information from its web page(s). That is, on a selected web page 110A, the desired/identified subset of data may be an item on a page and its characterizing information. The characterizing information may include one or more types of data (e.g. an image of the item for sale, a description of the item for sale, and its price).

Referring again to FIG. 1, the user interface 165 presents at least some of the estimated/expected subset of data that are identified (e.g. on display 224) as candidates 97 (also referred to as a candidate subset of data herein). The desktop tagging tool 160 may further receive input (e.g. from a user via the user interface 165) to confirm/assist in the selection of the subset of data, which is further provided as a response 98.

In one embodiment illustrated in FIG. 1, the gateway and schema server 120 provides the data candidates 97 for review by a user of the computing device 128. That is, the gateway and schema server 120 is configured to maintain one or more pre-defined criteria 96 in the database 126. The pre-defined criteria 96 define the type(s) of identified data (e.g. extract values for an image field, a description field, a title field). The database 126 further maintains one or more confidence intervals 95 which define patterns for spatially locating the different types of data. For example, the confidence intervals 95 may include information about an estimated location of an image for a corresponding image field. In one aspect, the confidence intervals 95 may also include information about the ranking of different probable candidates as may be calculated based upon a percentage of match between each probable candidate and the criteria defined in the confidence intervals 95. That is, if a probable candidate is ranked as a third nominee for the image value of an item, then this information is maintained in the confidence intervals 95.

Alternatively, the confidence intervals 95 may be maintained on a referrer web site (i.e. www.eshop.ca). The confidence intervals 95 may then be accessed by one of the computing device 128/server 120 to load the confidence intervals 95. The referrer site may maintain confidence intervals 95 that have been generated in accordance with previously saved objects (e.g. as saved by one or more users accessing the site) from the same web site.

Figure 7A:
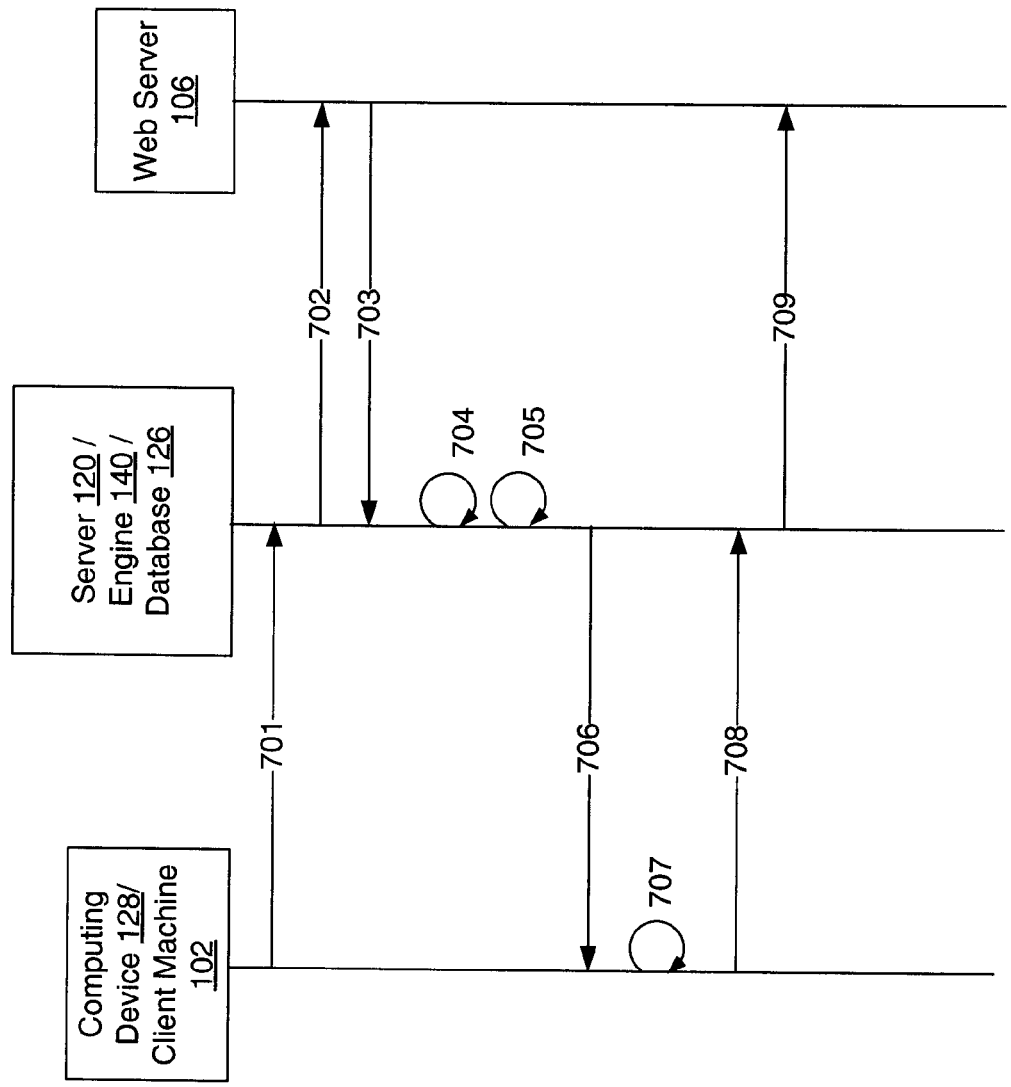
FIG. 7A illustrates an exemplary flow of interactions among components of the system of FIG. 1 for facilitating desktop tagging in accordance with an embodiment.

Referring to FIG. 7A, shown is an exemplary flow of interactions between the components of the system 100 for facilitating identification of subset of data from a web page. At 701, a user of the computing device 128 (or client machine 102) submits a request to access a selected web page (i.e. 110A as illustrated in FIG. 8A) to the gateway and schema server 120. At 702, the gateway and schema server 120 requests the selected web page 110A from the web server 106. At 703, the web server 106 provides an HTTP response to the server 120. As described earlier, the web page 110A contents may include navigational items, and other contents including lists, and objects.

At 704, the gateway and schema server 120 retrieves confidence intervals 95 and the pre-defined criteria 96 from the database 126. This operation may be performed by the engine 140 of the gateway and schema server 120. The pre-defined criteria 96 provide information related to the selected web page 110A, to help determine the types of data that may be identified. For example, the types of data defined in the pre-defined criteria 96 may include the following fields: image, title, description and price of a product on the web page 110A. The confidence intervals 95 may include patterns and other information to spatially locate and identify a value for each field from the web page 110A. For example, the confidence intervals 95 may include the location on the web page 110A (width and height) of each value for each data type. The location provided by the confidence interval 95 may be a relative location which defines the distance between different data types or may provide an estimated location on the page (e.g. the image is located closest to the center). The confidence intervals 95 may also define the estimated style associated with a data type (e.g. a title may be in a pre-defined font type or of a certain size or shading). Other identifiers may be used within the confidence interval 95 to locate the subset of data types. For example, the price value for the price field may occur after the text "Our Price". The image may be located next to the text stating "View more photos of product". As may be envisaged, other properties/characterizing information may be included in the confidence intervals 95 to estimate a field and its value on a web page. Accordingly, confidence intervals 95 may be provided on a per web site (e.g. 104) basis. Alternatively, one or more e-commerce web sites may have overlapping confidence interval information 95. This may be possible since many e-commerce web sites display products in a similar fashion. For example, the following lists some common patterns that may be used to define confidence interval 95 information: a title may be bold, the desired image may be near the middle of the page and relatively large in size, the description generally has a large amount of text, and may be black, the price may be highlighted and when rendered may be within close proximity to the desired image of the product for sale.

Further, in one embodiment, each of the confidence intervals 95 associated with a data type may be provided with a weighting. For example, it may be more important that an image of the product is located in the center than the image being the largest one on the page. Accordingly, a higher weight would be given to the confidence interval 95 containing the location information of an image type. In this manner, if more than one probable candidate data is defined as meeting the criteria provided by the confidence intervals 95, the probable candidate data may be ranked according to the weighting to provide more importance or relevance to certain criteria over others. Thus, the image having the optimal location may be selected as the candidate data 97.

Accordingly, since the confidence intervals 95 provide estimated patterns of the subset of data, it may be desirable to use the desktop tagging tool 160 for assisted capturing of web page 110A contents.

Referring again to FIG. 7, at 705, the server 120/engine 140 searches the selected web page 110A for the subset of data using either one or both of the confidence intervals 95 and the pre-defined criteria 96. That is, the server 120/engine 140 may use the pre-defined criteria 96 to search the web page 110A for the desired objects (e.g. product including image, title, description, and price). If one or more objects pass the analysis provided by the pre-defined criteria 96, the objects are considered as preliminary candidates. Additionally, the server 120/engine 140 may further review the preliminary candidates to determine which candidates meet the criteria provided by the confidence intervals 95. As discussed earlier, the confidence intervals 95 may define that an object belonging to a certain field (e.g. an image of a product) is estimated to have a certain pre-selected size/location on the web page 110A. Accordingly, at 705, the server 120/engine 140 determines one or matching candidates 97 in each field (e.g. the image of the product) on the web page 110A, meeting the criteria provided by the pre-defined criteria 96 and the confidence intervals.

Accordingly, at 706, the matching candidates 97 are provided to the computing device 128. Additionally, in one embodiment, at operation 706, the server 120/engine 140 may provide a JavaScript (or other executable instructions) for facilitating the identification/correction/confirmation of candidates 97 to the computing device 128. In the present embodiment, the JavaScript (or other executable instructions) provide instructions to the computing device 128 for implementing the user interface 165 of the desktop tagging tool 160. Accordingly, the desktop tagging tool 160 receives the candidates 97 and allows amendments/confirmation of the suggested candidates 97 via the user interface 165. Thus, the candidate data 97 may comprise at least one type of subset of data (e.g. an image field) and at least one value corresponding to each type (e.g. the image of the product) defining an element on the web page.

At 707, the candidates 97 may be confirmed or amended by the user via the user interface 165. At 708, the desktop tagging tool 160 provides a response 98 to the proposed candidates 97 in accordance with input received from a user to confirm/amend the candidates 97. The response (i.e. containing the confirmed candidates or amended candidates) 98 is provided to the server 120/engine 140. At 709, the server 120/engine 140 reviews the response 98 and updates/maintains the confidence intervals 95 or the pre-defined criteria 96 used to define the original candidates 97. For example, the candidates 97 provide an initial estimate of the desired objects and their location. The user interface 165 allows a user to modify incorrect matches for each of the fields (e.g. image, title, price) related to an object (e.g. a camera). This may be done, by allowing a user to click on or otherwise select each of the candidate 97 fields (e.g. image field) that was matched incorrectly, and then locate the desired correct match for the field (e.g. the correct image for the desired product) on the web page and select it. For example, the engine 140, may be configured to amend one of the confidence intervals 95 or the pre-defined criteria 96 only if a pre-determined number of responses 98 have been received which show that the candidates 97 have been amended.

In one embodiment, the confidence intervals 95 or the pre-defined criteria 96 may be amended by the server 120/engine 140 depending upon the type of amendment provided in the response 98. For example, if the types of fields to be extracted (i.e. image field, price field, description field) are correctly identified to the desktop tagging tool in the candidates 97, then the pre-defined criteria 96 may not be changed. On the other hand, if a user has amended the fields to be retrieved via the user interface 165, then the pre-defined criteria 96 may be updated accordingly. Alternatively, if the response 98 provides an amendment to the field values (e.g. the listed price of a product), then the confidence intervals 95 may be updated. For example, a new pattern may be determined for the amended field value. In one case, if the location/size/shading or other characterizing information of the amended field value is different than the suggested field value provided by the candidates 97, then the characterizing information in the confidence interval 95 for the field value may be changed accordingly.

Accordingly, in one embodiment, the amendment/confirmation of the confidence intervals 95 or the pre-defined criteria 96 based on the response 98 defines subsequent candidates 97 provided to the same or another computing device 128 when accessing the same or related web pages (i.e. as may be related by having the same genre).

Accordingly, in the present embodiment, the computing device 128 may perform the desktop tagging operations by providing a call to the server 120/engine 140 for a selected web page (e.g. 11A). The call may comprise requesting a JavaScript or other executable instructions for implementing the desktop tagging tool 160 on the computing device 128. The JavaScript or other executable instructions is generated dynamically on the server 120/engine 140 side. When a web page request (e.g. 110A) is made by the computing device 128, the engine 140 may first check the cookies provided by the computing device 128 for a user name and password for accessing the web site or for allowing desktop tagging. As described herein, the JavaScript or other executable instructions is defined by at least one of the confidence intervals 95 or pre-defined criteria 96 associated with the selected web page (e.g. 110A).

Alternatively, in another embodiment (not illustrated) the server 120/engine 140 is not provided and a web page request is provided directly from the computing device 128 to the web server 106. In the present embodiment, the pre-defined criteria 96 and the confidence intervals 95 are stored locally on the database associated with the computing device 128. Accordingly, once an HTTP response to the web page request is provided to the applicable computing device 128, the desktop tagging tool 160 is configured to generate the user interface 165 using instructions (e.g. JavaScript) stored on storage 212/216. The desktop tagging tool 160 may then identify and present potential candidates 97 on the user interface 165 based on the confidence intervals 95 or the pre-defined criteria 96. Similar to the embodiment discussed previously, the interface 165 allows manipulation of candidates 97 such as to update or confirm the confidence intervals 95 or the pre-defined criteria 96.

Figure 7B:
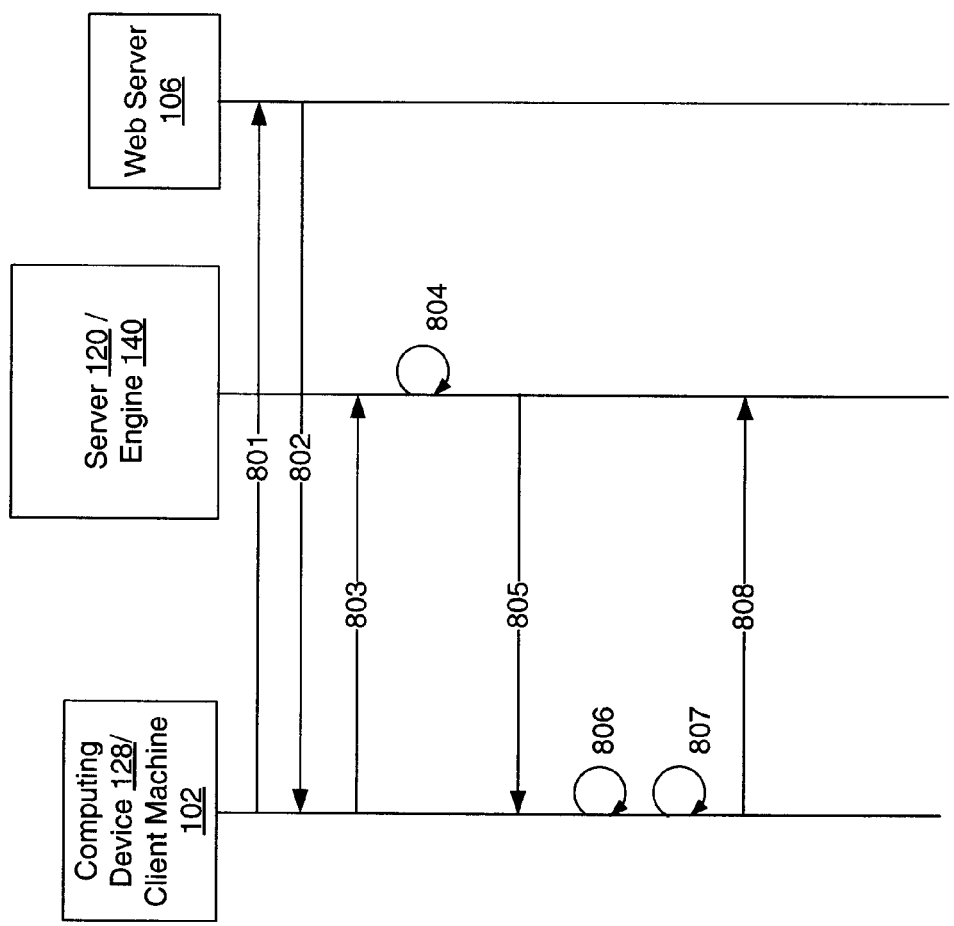
FIG. 7B illustrates an exemplary flow of interactions among components of the system of FIG. 1 for facilitating desktop tagging in accordance with an alternate embodiment.

Referring to FIG. 7B, shown is an alternate embodiment for identifying the subset of data from a selected web page (e.g. 110A). The process for identifying is similar to the one described in relation to FIG. 7A, however, in the present embodiment, the server 120/engine 140 maintains the confidence intervals 95 and the pre-defined criteria 96 (i.e. the type of data to identify). The computing device 128 requesting the selected web page may then apply instructions to the selected web page for identifying the subset of data based on the pre-defined criteria 96 and the confidence intervals 95 provided from the server 120. FIG. 7B further describes this operation.

At 801, a request for a selected web page (i.e. 110A) is provided from the client machine to the web server 106. At 802, a response to the web page request (i.e. an HTTP response) is provided. At 803, the computing device 128 provides a request to the server 120 to initiate desktop tagging thereon by requesting dynamic instructions (i.e. a dynamic JavaScript) from the server 120. At 804, the server retrieves the confidence intervals 95 and the pre-defined criteria 96 from its database 126. At 804, the server also retrieves instructions for identifying the subset of data and incorporates the confidence intervals 95 and the pre-defined criteria 96 therein to generate dynamic instructions. The dynamic instructions are provided to the client machine 102/computing device 128. At 806, the computing device 128 applies the received instructions to the selected web page to parse the web page (identify the candidate subset of data 97 and present same on the user interface 165). The user interface 165 allows amendments or confirmations of the candidate subset of data at step 807. At step 808, a response 98 is provided to the server 120 including any one of: the amended candidate subset of data or amended confidence intervals 95 or amended pre-defined criteria 96. Accordingly, the server 120 updates the confidence intervals 95 or the pre-defined criteria 96 based on the response 98 received.

Further, in one aspect, the identification of the subset of data on the selected web page as provided by the pre-defined confidence intervals 95 or the pre-defined criteria 96 may be tailored to capture key information from a web page for similar genres of sites. For example, e-commerce web sites, news web sites, weather web sites, sports web sites, stock data web sites, etc. or subcategories thereof may have similar formats for defining a web page. Thus, the pre-defined criteria 96 or the pre-defined confidence intervals 95 may have overlapping information for the same genre of site.

Referring to FIG. 8A, shown is a selected web page 110A, as requested for example by the computing device 128. As illustrated in FIG. 8A, the selected web page 110A may include a plurality of additional information that may not be of interest to the user. Additionally, a limited screen size may mean a smaller set of information from the web site is desirable. Referring to FIG. 8B, shown is an example view of the interface 165 of the desktop tagging tool 160. For example, FIG. 8B illustrates a form 170 for presenting the following fields: image, title, description, and price of and their corresponding values for the selected product. The interface 165 presents a plurality of candidate data 97 for the fields (e.g. the title description for the title field) for review by the user of the computing device 128. The candidate data 97 are estimated/ expected data identified from the web page 110A (as may be done by the engine 140). The user may then navigate the interface 165 to confirm or amend the candidates 97 by modifying/maintaining the field values provided.

Figure 8C:
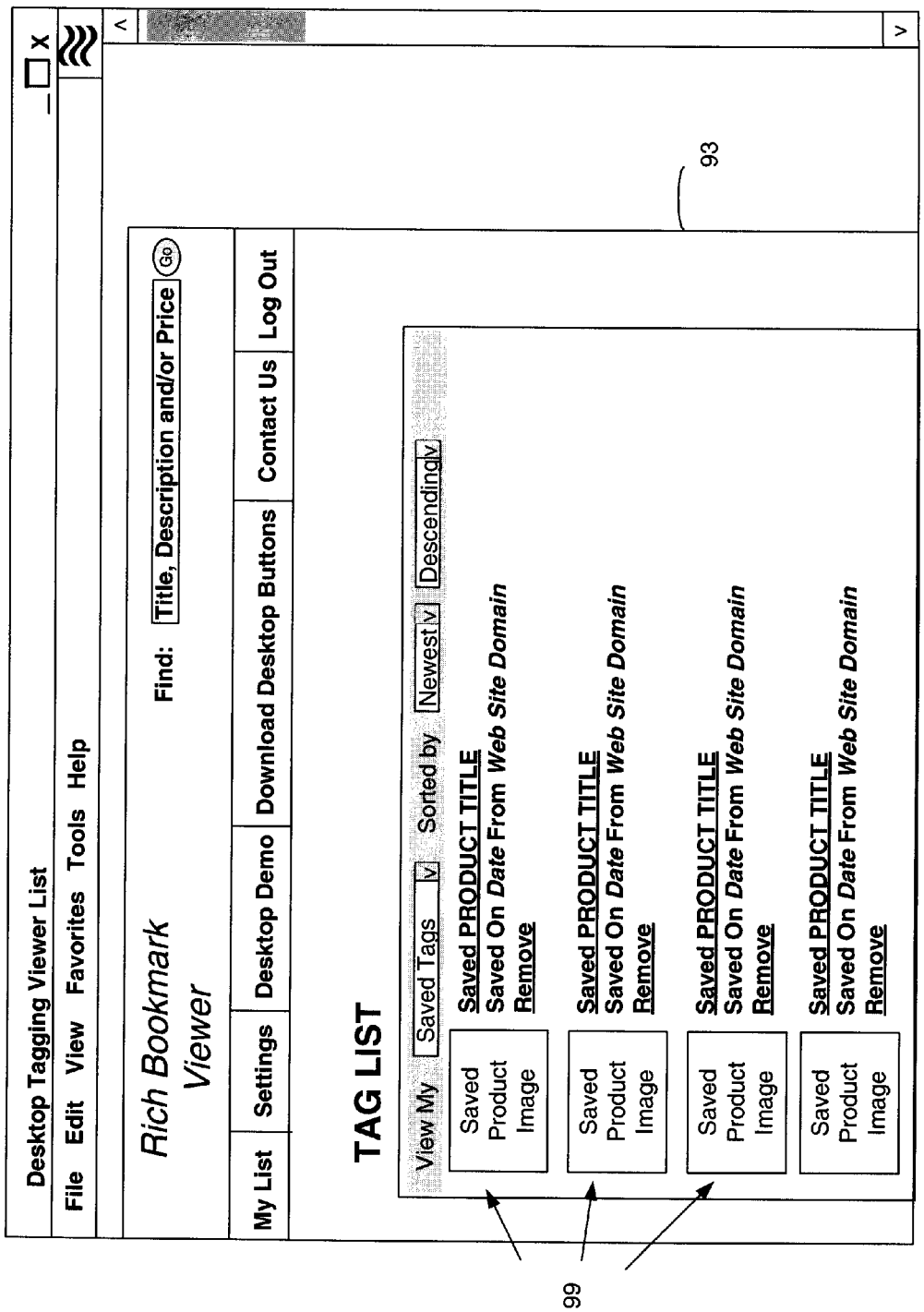
FIG. 8C illustrates example rich bookmarks generated via the desktop tagging tool of FIG. 1.

As illustrated in FIG. 8B, in one embodiment, the user may be provided with an option to save the candidate data 97 (as originally presented or as amended (response 98)) displayed on the user interface 165. In the present embodiment, the desktop tagging tool 160 is configured to create a rich bookmark 99 (FIG. 8C) upon the user requesting to save candidate information 97/98 displayed on the user interface 165. An example of rich bookmarks 99 are illustrated in FIG. 8C. The rich bookmark 99 may comprise information describing the bookmark and the candidate information 97/98. For example, the rich bookmark 99 as displayed in FIG. 8C comprises one or more field values (e.g. the product image, title, price and description from the selected web page 110A) and a URL for the web page (e.g. 110A) associated with the rich bookmark 99. That is, the rich bookmark 99 may comprise a displayable link (e.g. URL) and identified portions of the web site data (candidate data 97/98) associated with the URL. As mentioned earlier, this may include field values such as image, item title, description of an item, a text body related to the item. The identified portions of the web site that are to be displayed may be defined via the user interface 165 of the desktop tagging tool 160 which confirms/amends the candidates 97 as presented. Accordingly, the rich bookmarks 99 may be retrieved as requested by a user, for example of the computing device 128. A list 93 of rich bookmarks 99 may be displayed as associated with the user/the computing device 128. The user may then navigate the tagged items, to select one of the rich bookmarks 99 (e.g. to return to the view illustrated in FIG. 8B or 8A). Rich bookmarks may be shared with other users (not shown).

The following exemplary operations illustrate the process of desktop tagging and identification of desired content from a web page as discussed in reference to FIGS. 7A and 7B.
1) User (e.g. of computing device 128) navigates to the selected web page (e.g. 110A)
2) User requests connection to server 120
3) A request is made to the server 120 for the JavaScript or other executable instructions to implement the desktop tagging tool 160
4) The server 120 receives the request
   a) The server 120 checks to see if the user is already logged in, if the user is not logged in, the server 120 checks for cookies with the user credentials
   b) The server 120 extracts the requesting site from the referrer section of the HTTP request
   c) The server 120 attempts to retrieve the confidence intervals 95 for the site (based on predefined identification criteria 96).
   d) The server 120 dynamically creates the JavaScript based on the information from operations (a) and (c).
   e) The server 120 returns the JavaScript to the client (e.g. computing device 128)
5) The client receives the JavaScript, which initiates variables required to start the engine (e.g. the desktop tagging tool 160), and then launches the engine.
   Code snippet: watPM.watStart(window);
6) The function watPM.watStart(window) performs the following tasks (e.g. based on the identification criteria 96)
   a) Initializes the objects variables
   b) Locates the largest rendered frame
   c) From the largest frame, all <head> and <body> tags are extracted.
      Code snippet: getElementsByTagName('body');
   d) The remaining tags i.e. <a> <td>
      Code snippet: getElementsByTagName('body');
   e) A style sheet from the server 120 is then injected into the head of the document
   f) Special characters such as ″ are replaced with their respective rendered characters i.e. ″=″
   g) The GUI for the server 120 (i.e. UI 165) is injected into the body, as the first element
      i. API call document.element.insertBefore(new_element);
   h) Operation 0 is then called setTimeout("top.watPM.watStage(0)", 20);
7) The function setTimeout("top.watPM.watStage(0)", 20); performs the following tasks by calling watScriptX( )
   a) All script tags that are embedded within the page are removed
      i. API call document.removeElement(element);
   b) Operation 1 is then called setTimeout("top.watPM.watStage(1)", 10);
8) The function setTimeout("top.watPM.watStage(1)", 10); performs the following tasks by calling watParseIt(0). This function looks at all of the tags. However it only process 1000 at a time, for example, to help avoid the warning message a browser prompts with "The JavaScript is not responding". So for each tag the functions performs the following (e.g. based on the identification criteria 96)
   a) Extract the tag name (i.e. <A> <BR> <TABLE>)
   b) Ensure the current tag is visible. If the tag is not visible (one of the following styles implies hidden visibility=hidden display=none) the tag is ignored.
   c) The position of the tag (absolute, relative, etc) are extracted from its style property
   d) If the tag is one of the following it is ignored ('LINK', 'STYLE', 'HEAD', 'TITLE')
      i. For example <title>Hewlett-Packard—42″ Plasma HDTV—PL4260N</title> is ignored
   e) If the position (c) is absolute, and the x coordinate <0 and/or the y coordinate is <0 the element is ignored
      i. For example <div id="kioskMessage" style="display: none;"> and all of its children are ignored
   f) All JavaScript actions from the given object are cleared. (i.e. object.onclick will be set to return false;
      i. For example <script language="JavaScript">if(is Kiosk){var
         kioskwarning=document.getElementByd("kiosk-Message");kioskwarning.style.display="block"; strAdHeight2=kioskwarning.offsetHeight;}</ script> is removed
   g) If the objects tag=IMG or (tag=INPUT and type=image) the object is saved as a candidate 97 for the products image.
      i. For example <img src="http://images.bestbuy.com: 80/BestBuy_US/images/products/7731/77 31564_rc.jpg" alt=" " border="0" align="top"> the product image
      ii. For example <img src="http://images.bestbuy.com: 80/BestBuy_US/images/products/7426/74

26458_s.gif" alt="7426458 Front Thumbnail" border="0" height="45.0" width="54.0" align="center"> not the correct product image, but still an image.
h) If the objects tag is in the following ('TD', 'UL', 'P', 'DIV', 'SPAN', 'B', 'H1', 'H2', 'H3', 'H4', 'H5', 'H6', 'STRONG', 'FONT', 'BIG') and the objects innerHTML code length is <1024 (for example) the object is stored as a possible candidate 97 for the product's title, price, and description.
   i. For example <td class="Body-Headline" colspan=2>Hewlett-Packard42" Plasma HDTV<br></td> the correct title
   ii. <b>More Options</b> an incorrect title
   iii. <td class="Body">Watch all of your favorite high-definition quality broadcasts on this 42" plasma TV that features SRS . . . </td> the correct description
   iv. <td class="Body" valign="top">16:9 widescreen aspect ratio delivers a cinema-style entertainment experience; 3-2 pulldown for accurate reproduction of film-based sources</td> an incorrect description
   v. <div class="priceblock">Our Price: $1,199.99<br></div> the correct price
   vi. <div class="priceblock">Our Price: $99.99<br></div> an incorrect price
i) Operation 2 is then called setTimeout("top.watPM.watStage(2)", 10);
9) The function setTimeout("top.watPM.watStage(2)", 10); performs the following tasks by calling watSetTitles( ), which calls watAttrib(hcc,lcc,tcc), (e.g. based on the identification criteria 96);
   i. var hcc=[2,1]; //initial requirements
   ii. var tcc=[2]; //post location requirements
   iii. var lcc=this.ltitle;
   a) all candidates for titles from operation 8 are compared with each other. The top 5 (for example) are selected from the following:
     i. First the objects weight is assigned a numeric value based on their rendered weight. Each objects' weights are compared.
       1. not defined, normal, and 400=400
       2. bold, bolder and >400=700
       3. <400=300
     ii. Any ties are broken by the objects rendered size. The size is assigned a numeric value based on its rendered size.
       1. x pixels=x
       2. x pt=4/3*x
       3. HN=
         a. Tag=H1=2
         b. Tag=H2=3/2
         c. Tag=H3=9/8
         d. Tag=H4=1
         e. Tag=H5=13/16
         f. Tag=H6=5/8
         g. Tag=ELSE=1
       4. x %=x*(16/100)*HN
       5. x em=x*16*HN
       6. xx-small=10
       7. x-small=12
       8. small=16
       9. medium=18
       10. large=24
       11. x-large=32
       12. xx-large=48
       13. 1 or −2=10
       14. 2 or −1=13
       15. 3=16
       16. 4 or +1=19
       17. 5 or +2=24
       18. 6=32
       19. 7=48
       20. ELSE=12
   b) The candidates 97 are then arranged in order based on their distance from the center of the page. The closest to the center would be the first choice. Etc. . . . The center of the page is defined by the confidence intervals 95.
   c) Finally the winning candidate 97 is selected by comparing the confidence interval 95 of the most common winner, the confidence interval 95 of the location, and the weight of each object.
   d) For example, comparing the correct title, and the incorrect title above. Both would evaluate to a weight=700. The size of the correct item is larger, so it would be ranked ahead. Next the locality of each object would be compared. Since the correct title is closer to the center it would remain ranked higher. The items would then be re-ranked based on their weight. Since there weights are equal the winner is the correct title.
   e) Operation 3 is then called setTimeout("top.watPM.watStage(3)", 10);
10) The function setTimeout("top.watPM.watStage(3)", 10); performs the following tasks by calling watSetDescription( ), which calls watAttrib(hcc,lcc,tcc), (e.g. based on the identification criteria 96);
   i. var hcc=[5,−1]; //initial requirements
   ii. var tcc=[ ]; //post location requirements
   iii. var lcc=this.ldesc;
   a) all candidates 97 for titles from operation 8 are compared with each other. The top 5 (for example) are selected from the following:
     i. First the objects length of the innerHTML (the length of the source html code the object contains). The longer the length, the more likely it is a description.
     ii. Second the weight of the object is compared. A detailed explanation was provided in operation (9). The −1 signifies that a candidates weight counts as a negative attribute. Therefore, text that is not bold/italic etc is more likely to be a description.
   b) The candidates are then arranged in order based on there distance from the center of the page. The closest to the center would be the first choice. Etc. . . . The center of the page is defined by the confidence intervals
   c) Finally the winning candidate 97 is selected by comparing the confidence interval 95 of the most common winner, the confidence interval of the location.
   d) For example, comparing the correct description, and the incorrect description above. The length of the correct item is larger so it would be ranked ahead. Next the locality of each object would be compared. Since the correct description is closer to the center it would remain ranked higher. The items would then be re-ranked based on their weight, where a stronger weight counts against the item. Since there weights are equal the winner is the correct description.
   e) Operation 4 is then called setTimeout("top.watPM.watStage(4)", 10);
11) The function setTimeout("top.watPM.watStage(4)", 10); performs the following tasks by calling watSetPrice( ), which calls watAttrib(hcc,lcc,tcc), (e.g. based on the identification criteria 96);
   i. var hcc=[6,9,8,2,1]; //initial requirements
   ii. tcc=[6,9]; l/post location requirements
   iii. var lcc=this.ldesc;

a) all candidates 97 for titles from operation 8 are compared with each other. The top 5 (could change later) are selected from the following:
   iii. First the objects text is searched for a dollar sign ($). Objects that have a dollar sign will be ranked higher
   iv. Second the objects text is casted to a decimal. If the cast is successful, i.e. the text is a number the element is ranked higher.
   v. Third the objects text is scanned to determine if any numbers exist. If a number is found the object is ranked higher
   vi. Fourth the objects weights are compared. Objects that are bold/italic will rank higher
   vii. Fifth the objects size is compared. The larger the font of the price the more likely it is the products price.
b) The candidates 97 are then arranged in order based on there distance from the center of the page. The closest to the center would be the first choice. Etc. . . . The center of the page is defined by the confidence intervals 95
c) Finally the winning candidate is selected by comparing the confidence interval 95 of the most common winner, the confidence interval 95 of the location, whether or not a $ sign exists, and whether the text is a numeric.
d) For example, comparing the correct price, and the incorrect price above. Both would evaluate to true when searching for a dollar sign. Neither item is a decimal, as they both contain text. Both would evaluate to true when searched for numbers. Both weights would evaluate to 700. Finally the size of both items are equal. So the item is tied, and since html is a top down language the first item is ranked higher in our case the incorrect item. Next the locality of each object would be compared. Since the correct price is closer to the center it would now be ranked higher. The items would then be re-ranked based on the dollar sign and decimal tests. Since both items evaluate to be equal the winner is the correct price.
e) Operation 5 is then called setTimeout("top.watPM.watStage(5)", 10);

12) The function setTimeout("top.watPM.watStage(5)", 10); performs the following tasks by calling watSetGraphics( ), which calls watAttrib(hcc,lcc,tcc), (e.g. based on the identification criteria 96);
a) all candidates 97 for titles from operation 8 are compared with each other. The top 5 (could change later) are selected from the following:
   i. First find the rendered width and height of the image.
   ii. Determine the distance from the center of the page
   iii. Compare an object by taking its area–distance to the center. The object that results with the larger number is more likely to be the image.
   iv. For example, comparing the correct image, and the incorrect image above. The area of the correct image is visibly larger than that of the incorrect image. As well the correct image is also visibly closer to the center. Then if the correct image CA, and the incorrect image IA would demonstrate: area of CA–distance to middle CA>area of IA–distance to center. Hence the correct image is chosen.
b) Operation 6 is then called setTimeout("top.watPM.watStage(6)", 10);

13) The function watAdditem takes the guess for the desired fields: e.g. image, title, description, and price and displays them to the user (as illustrated in FIG. 8B). The user now has the ability to change a selection via the interface 165 by selecting the field that was guessed incorrectly. For example, this field will be highlighted in yellow, then locate the correct item on the page, when the correct item is highlighted in yellow, selecting that item will update the guess.

14) The user clicks Save (as illustrated in FIG. 8B) or other forms of confirming the update to the candidate information 97.

15) The response 98 containing the updated candidates 97 is provided to the server 120. For example, a form is posted to the server 120 with the product's image, price, title, and description. As well for each field, the x,y location of the field and the guess number is sent to the server 120.

16) The server 120 receives the request (e.g. 98) and updates the database 126 accordingly. The server 120 also downloads the selected image, to help avoid hot linking when displaying products.

Accordingly, the semi-automated process provided by the desktop tagging tool 160 may be used to assist with the identification of desired web page contents (i.e. as provided in the candidate subset of data 97) to be displayed on the computing device 128 for the selected web page (e.g. 110A).

Signature (Transcoding) Engine Syntax

In accordance with a present embodiment, further details concerning the syntax of schema instructions are described.

Lookup Syntax

The lookup tag instructs the engine 140 to perform an insert, delete or query the document contents.

Type: Defines the data type of the lookup. Type may be "pex" for a string expression. Type may also support more advanced options such as regular expressions, API calls, and SQL queries.

Action:

Action="locate_string": Look for a string ("ref" identifier") value within the data. Return true iff the string exists in the data (i.e. the "ref" identifier index>=0).

Action="replace_string": Replace a string within the data with the "ref" identifier.

Action="move_ptr": Remove all characters in the data that exist before the location of the "ref" identifier.

Action="end_ptr": Remove all characters in the data that exist after the location of the "ref" identifier.

Action="get_string" Extract a string based on the location of the "ref", "start", and "end" identifiers.

ID: ID is an identifier of another section within the signature. It allows the result of a query to trigger another set of actions within the signature. This is primarily used when identifying page types. Once a match has been made, specific instructions are executed that are marked with this ID. Recursive data structures (e.g. lists within lists) may also be supported.

Ref: Ref defines the initial identifier that the lookup searches for. If an AND case is required multiple ref identifiers can be used (i.e. ref="string1" ref1="string2"). If an OR case is required ref_[ref identifier]_alt_1 can be used (i.e. ref="string1" ref_alt__1="string2"). To demonstrate (X="1 " ||Y="2") && (A="8 " ||B="9") would translate to ref="1" ref_alt__1="2" ref1="8" ref1_alt__1="9".

Repeat_[identifier]: Repeat executes the identifier query additional times. For example, if ref="hello" to set the identifier index at the second occurrence of hello the following tag would be added: repeat_ref="1".

Location:

Location="before": Search the data in a reverse direction, starting from the "ref" identifier. This implies that both the "start" and "end" identifier indexes must be less than the "ref" index.

Location="middle": Search the data in two directions, starting from the "ref" identifier. This implies that the "ref" identifier index is greater than the "start" identifier index and less than the "end" identifier index.

Location="after": Search the data in a forward direction, starting from the "ref" identifier. This implies that both the "start" and "end" identifier indexes must be greater than the "ref" index.

Start: Start is primarily used when action="get_string" and may also be used for replace/remove instructions. The start identifier index will be the start index of the string to extract. If an AND case is required multiple "start" identifiers can be used (i.e. start="string1" start1="string2"). If an OR case is required start_[start identifier]_alt_1 can be used (i.e. start="string1" start_alt_1="string2"). To demonstrate (X="1"||Y="2") && (A="8"||B="9") would translate to start="1" start_alt_1="2" start1="8" start1_alt_1="9". To find the $n^{th}$ match see the repeat syntax.

End: End is primarily used when action="get_string" and may also be used for replace/remove instructions. The end identifier index will be the end index of the string to extract. If an AND case is required multiple "end" identifiers can be used (i.e. end="string1" end1="string2"). If an OR case is required end_[end identifier]_alt_1 can be used (i.e. end="string1" end_alt_1="string2"). To demonstrate would translate to end="1" end_alt_1="2" end1="8" end1_alt_1="9". To find the $n^{th}$ match see the repeat syntax Max_index: Max_index is used to limit the scope of a query by ensuring that no other identifier index is greater than the "max_index" . . . . If an AND case is required multiple "max_index" identifiers can be used (i.e. max_index="string1" max_index1="string2"). If an OR case is required max_index_[max_index identifier]_alt_1 can be used (i.e. max_index="string 1" max_index_alt_1="string2"). To demonstrate (X="1"||Y="2") && (A="8"||B="9") would translate to max_index="1" max_index_alt_1="2" max_index="8" max_index_alt_1="9". To find the $n^{th}$ match see the repeat syntax.

Max_Index_Use_Ref: Max_Index_Use_Ref is a Boolean value set to 0 or 1. It is used with Max_index. When set to 0, the "max_index" will begin querying at the beginning of the data. When set to 1, the "max_index" will begin querying from the "ref" identifier index.

Gbl_append_[identifier]: Gbl_append appends a string passed via the url to the identifiers query value Gbl_Repeat_[identifier]: Gbl_Repeat executes the identifier query additional times. For example, if ref="hello" to set the identifier index at the second occurrence of hello the following tag would be added: gbl_repeat_ref="var" where var would be passed in the URL i.e. http://www.eshop.ca/mobile/fatfree.asp?site= . . . &url= . . . &var=1.

Tolerance: Tolerance is a Boolean value set to 0 or 1. It is used to return an empty string. By default tolerance is set to 0 which enforces that a property be found on a page, otherwise the page will be marked as "invalid" and an appropriate error message returned. When set to one, an empty value is returned for properties that can not be located.

Include_sz: Include_sz is a Boolean value set to 0 or 1 and used with get_string. It is by default set to 0. When set to 1 it includes the "start" value and the "end" value as part of the result.

Include_start: Include_start is a Boolean value set to 0 or 1 and used with get_string. It is by default set to 0. When set to 1 it includes the "start" value as part of the result.

Include_end: Include_end is a Boolean value set to 0 or 1 and used with get_string. It is by default set to 0. When set to 1 it includes the "end" value as part of the result.

Closetag: Closetag is a Boolean value set to 0 or 1 and used when action="get_string". It appends /> to the extracted value.

Strip_Tags: Strip_Tags removes HTML tags from the value and used when action="get_string".

Strip_tags="1": remove all tags.

Strip_tags="2": remove all br and script tags.

Strip_tags="3": remove all tags except replace </p> </li> with <br>.

Strip_tags="4": remove all tags except replace </div> <br> with <br>.

Strip_tags="tag1, tag2, . . . , tagN": remove all tag1, tag2, . . . tagN leaving any tag not listed.

Notrim: Notrim is a Boolean value set to 0 or 1 and used when action="get_string". By default all value have white spaced trimmed. When this property is set to 1, white space is not trimmed.

Append: Append is a string value and used when action="get_string". It appends a string to the extracted value.

Prepend: Prepend is a string value and used when action="get_string". It prepends a string to the extracted value.

Upper: Upper is a Boolean value set to 0 or 1 and used when action="get_string". It converts all characters to upper case.

Lower: Lower is a Boolean value set to 0 or 1 and used when action="get_string". It converts all characters to lower case.

Page Syntax

The page syntax extracts the paging information from the data. This allows the end user the ability to change pages just as on the desktop.

Page_variable: Defines unique key that defines a family's paging feature.

Page_start: Defines value of first page in a family's paging feature.

Page_post: Path where paging variable(s) must be transmitted to.

Page_start: Defines value of first page in a family's paging feature.

Page_increment: Defines value that paging increases by for each page in a family's paging feature.

Page_block: Defines unique key that defines a family's paging block feature.

Page_block_size: Defines the size of the family's page block. (i.e. 10 items per page)

Url_append: Append the unique key that defines a family's paging feature and the page number.

Search Syntax

Make a web site family's search feature functional by specifying details such as what variable to post.

Search_path: Search path where search variable must be transmitted to

Search_variable: Name of search variable which a web site's search feature is looking to read, request, post, etc.

Url_replace: Remove a portion of the url that is specific to posting search parameters URL Syntax The url tag defines global properties for a site, including the url, and name: <url location="http://www.eshop.ca" key="eshop.ca" name="E-Shop"/>

Name: Name is the name to display when browsing using the gateway 120

Location: Location defines the fully qualified address of the site.

Key: Key is the site.

Advanced Syntax

The advanced tag defines global properties for the site. This at a minimum includes the path to the initial page of the site.

```
<advanced>
    <index_link value="http://www.eshop.ca" />
    <check_out value="1" />
</advanced>
```

Index_link: Index_link specifies the path to the initial page of the site. This is usually the same page as the location property from the URL syntax. This field is always required.

Append_link: Appends a string value to every URL requested for this site.

No_purchase: No_purchase is a Boolean value 0 or 1. The default value is 0 which implies that an item should contain a purchase link. When true, the purchase link is removed.

No_item: No_item is a Boolean value 0 or 1. The default value is 0 which implies that Item pages should show up in the breadcrumb. When true, the item is not added to the breadcrumb.

Check_out: Check_out is a Boolean value 0 or 1. The default value is 0 which implies that Item purchase link sends the request and control away from the gateway server 120. When true, then a checkout process has been created for use with gateway server 120.

Product_img_width: Product_img_width defines the width of all item images.

Use_cookies: Use_cookies a Boolean value 0 or 1. By default it is set to 0, and cookies are not passed to the site. When true, gateway 120 passes all cookies from client machine 102 to the site 104, and from the site 104 to the client machine.

Page Type Syntax

The page type is a collection of lookup queries that have an id associated with them. Lookup queries may be processed in a top down fashion. The first successful lookup will trigger another section in the signature schema document. For example, if the following evaluates to true:

```
<page_type>
    <lookup type="pex" action="locate_string" name="list_elements" id="mylist_1" ref="<!--" />
</page_type>
```

Then the tag element <list_elements id="mylist_1"> would be executed next.

General Element Syntax

Elements include list_elements, menu_elements, item_elements, search_elements, form_elements. Each element has an ID. For example a menu element:
<menu_element id="menu_id"/>

The element may contain the following sub containers (settings, actions, elements, paging) which scope resides only within the element. Each element is associated with a specific rendering function.

```
<menu_element id="menu_id"/>
    <settings></settings>
    <paging></paging>
    <elements></elements>
    <actions></actions>
</menu_element>
```

Settings Syntax

Settings syntax varies based on the type of element it resides in. Settings allow customizations that only apply to a specific page family.

Black_list—menu_elements: Black_list removes menu items with names that reside in the black list. Each entry is separated delimited (e.g. using two pound characters (##)).

Pass_image—list_elements, search_elements: Pass_image adds the image path to the url when requesting an item. The image added to the url will be used as the item image.

Price[n]—item_elements: Price[n] where n is an integer renames the rendered item with name price[n].

Action—form_elements: Overrides the action of a form displayed to the end user.

Handle—form_elements

Handle="display"—display the form to the end user.

Handle="post"—post the form.

Handle="get"—get the form.

Cookie—form_elements: Send additional cookies when posting this form.

Input_[identifier]—form_elements: Input tag adds/modifies a form value with name [identifier] setting its value.

Rename_[identifier]—form_elements: Rename tag renames a form value with name [identifier].

Actions Syntax

The actions tag primary function is data manipulation. It contains lookup queries that modify data with actions of "move_ptr" or "end_ptr".

```
<actions>
    <lookup type="pex" action="move_ptr" ref="</head>" />
</actions>
```

Persons of ordinary skill in the art will appreciate that alternative embodiments are contemplated. Though not shown, a client machine may incorporate a transcoding engine, applying a signature schema document obtained from a repository such as repository 124 to web pages received from a web site. For example, client machine 102B may be configured with an engine in cooperation with a mini-browser application or plug-in to another application. The engine obtains the schema document to apply against web page content from a particular web site. Communications with the web site may be direct and not via a gateway 120. The transcoding engine may apply the commands from the schema and transcode appropriately for rendering content by the mini-browser or via the plug-in.

Figure 4:
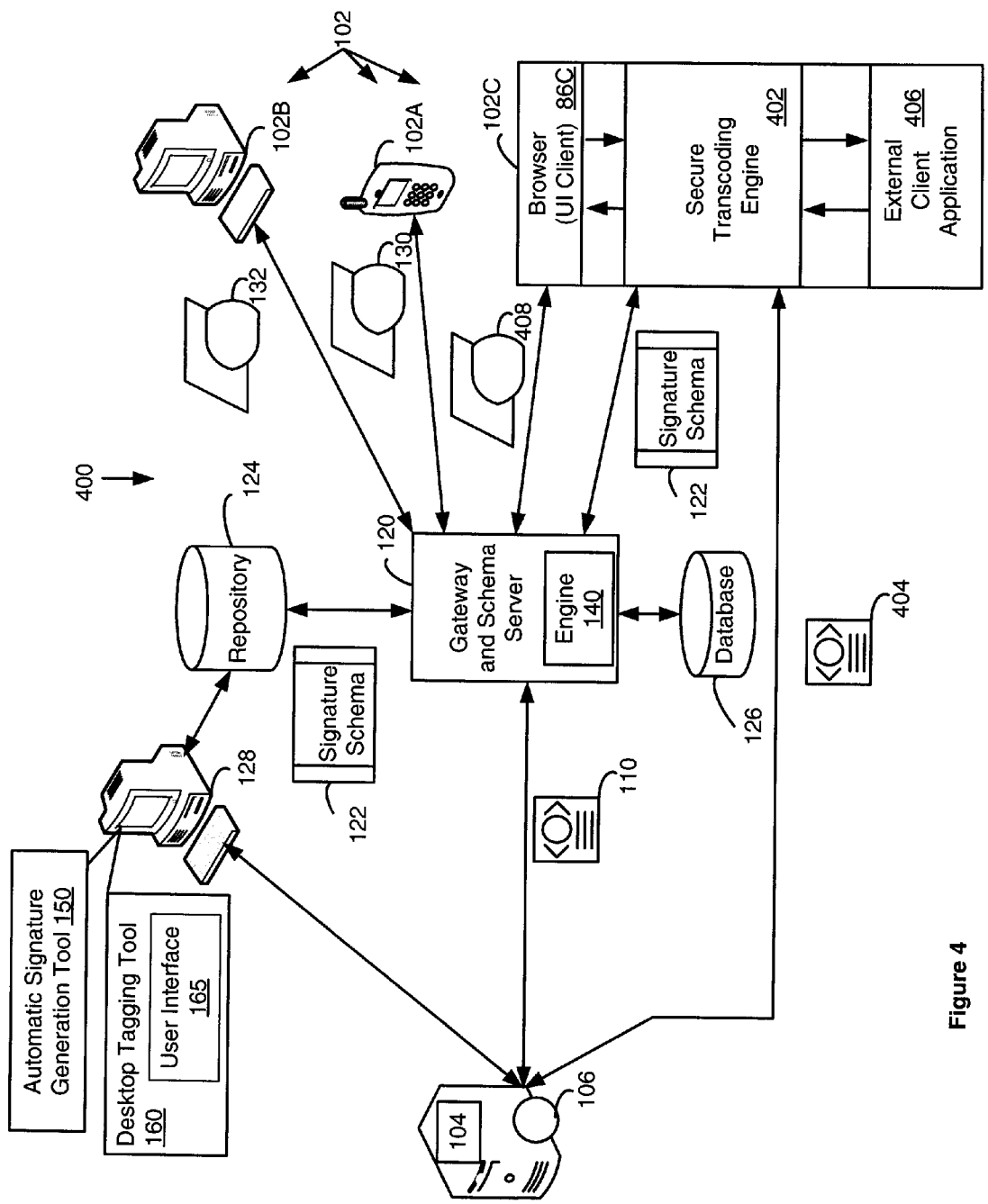
FIG. 4 is a schematic representation of a system for content navigation in accordance with another embodiment.

FIG. 4 illustrates a further embodiment comprising a system 400 for content navigation, similar to system 100 of FIG. 1 but in which a client machine 102C incorporates a secure transcoding engine 402, for example, for communicating directly with web site 104 via secure communications (e.g. Secure Sockets Layer (SSL) or Transport Layer Security (TLS), etc.). Client machine 102C may be a wireless device such as device 102A or wired device 102B comprising components as described with reference to FIG. 2 and as further described with reference to FIG. 4.

Large public database-driven web sites do not typically encrypt data that is publicly available. Instead, the sites encrypt specific pages that contain user information, for example login, signup, checkout, and account management pages. One reason why all content is not encrypted may be that SSL/TLS is resource intensive and reduces scalability. Another reason why all content is not encrypted may be that SSL/TLS increase response times for the end user due to the time spent encrypting and decrypting content. Examples of web sites that follow this model include online stores, news sites, sports information and weather. Therefore, since the number of SSL/TLS pages is relatively small, signature schema can be created to define a mobile friendly layout. Another benefit of the signature schema, is that each field in an HTML form can be classified and populated with user data from an external application. It will be understood that each individual SSL/TLS page will likely require its own respective page family template within a schema.

In contrast to FIG. 1, FIG. 4 shows a client machine 102C comprising a browser application 86C similar to browser 86 for communicating with web site 104 via gateway and schema server 120. In a similar way, a signature schema may be used to transcode un-encrypted communications of web pages 110 to provide transcoded data 408. However, browser 86C may be further configured to communicate through secure transcoding engine 402, handing off communications for secure web pages 404 when such communications between machine 102C and web site 104 are to be encrypted. Secure transcoding engine 402 may communicate with gateway and schema server 120 to obtain the signature schema document 122 which may be applied to transcode secure communications with web site 104.

Figure 5:
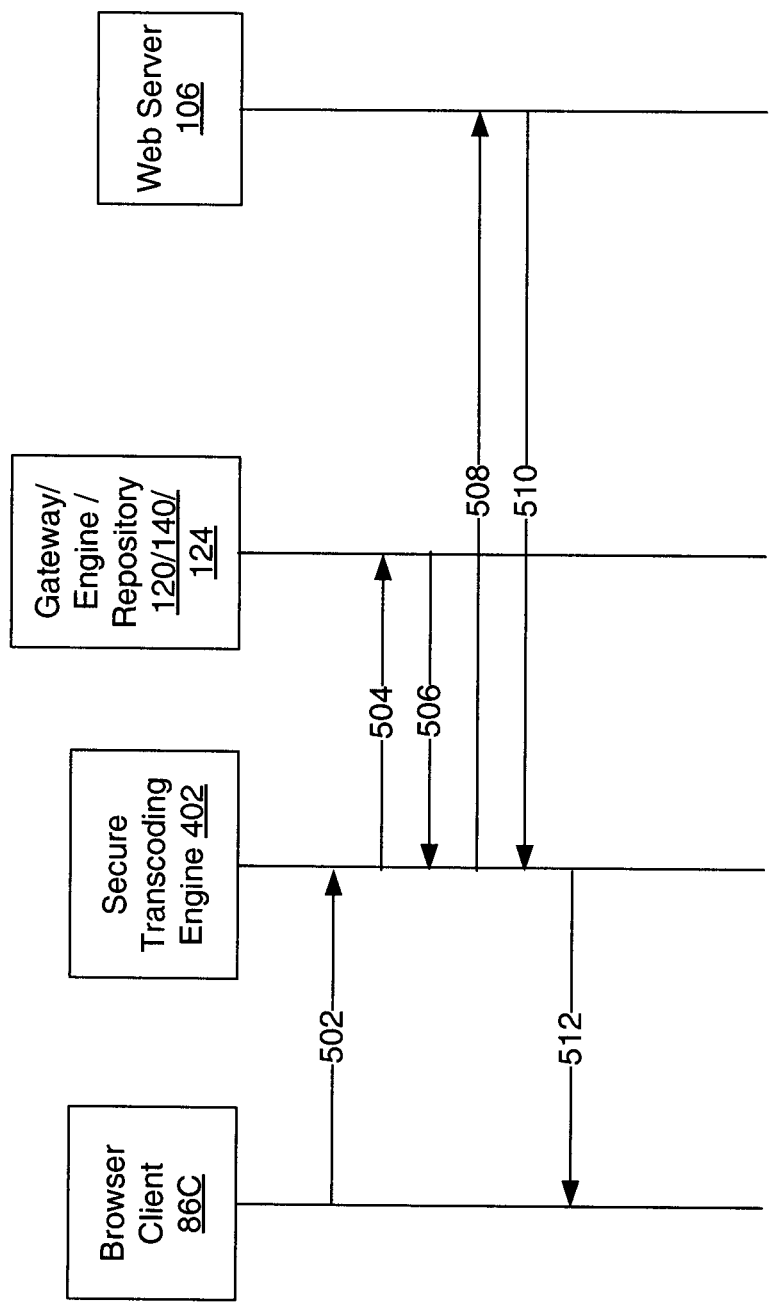
FIG. 5 illustrates a flow of interactions among components of the system of FIG. 4.

FIG. 5 illustrates a flow among client machine 102C, gateway and schema server 120 and web site 104 for secure communications such as for web page 404. It may be presumed that client machine 102C has previously initiated a flow similar to FIG. 3 for a web page 110 that has resulted in transcoded response 408 from gateway and schema server 120 including the actual location of the secure content (e.g. for end to end encrypted communications with site 104 via HTTPs protocols). Browser 86C hands off the request communication (502) to secure transcoder engine 402. Secure engine 402 requests (504) a signature schema 122 from server 120/engine 140. The request may be validated and the schema 122 returned (506) by the engine 140 from schema repository 124 as may be necessary. Secure engine 402 requests 508 the secure content (e.g. 404) via end-to-end encrypted communication from the web server 106. The secure engine 402 receives (510) the secure content 404 from the web server 106, decrypts the content and then invokes the transcoder using the signature schema 122 as instructions to extract the subset of data from the web page 404 and to re-construct the content in a mobile friendly view for rendering by the browser.

Schema document 122 may include instructions for populating secure responses to web site 104 with data previously stored to client machine 102C. Such information may include personal information that has been stored using an external client application 406 such as a password keeping application for securely storing (encrypted) personal information. Schema documents may be coded with suitable instructions to invoke communications or application programming interfaces between the secure transcoding engine and external application 406 to securely obtain such data. Such information may be available via a plug-in (not shown) to browser 86C.

System 100 may be implemented so that a plurality of web sites are coupled to the telecommunication network (either alone by a server 106 or by a plurality of web servers like web-server 106), and that a corresponding plurality of schemas for each of those web sites (or each of the web pages therein, or both) can be maintained by gateway and schema server 120 and repository 124. There can in fact be a plurality of gateway and schema servers (like server 120). Client machines 102 can be configured for proxied connection through different servers 120. Servers 120 can be hosted by a variety of different parties, including, for example but without limitation: a) a manufacturer of client machine 102, b) a service provider that provides access to the telecommunication network on behalf of user U of a client machine 102; c) the entity that hosts web-site 104 or d) a third party intermediary. In web site host example it can even be desired to simply combine the web server 106 and schema server engine 120 on a single server to thereby obviate the need for separate servers.

Accordingly, signature schemas may be defined to provide custom browsing experiences for small (e.g. mobile) devices (among others) and the proposed framework avoids changing web site code for existing web sites. Data extracted from the web sites may be intelligently stored to a relational database using knowledge of the web pages (i.e. the objects and their attributes) incorporated into the signature schemas. Query language may be used to direct a search of the web page as an ASCII text file to look for signatures to distinguish the web page's family (from other web page families of a site) and to identify the subset of data to be extracted.

The invention claimed is:

1. A method of identifying a subset of data from a selected web page of a web site for display on a client machine, the method comprising:
dynamically generating, at a server machine, one or more instructions for identifying and displaying a candidate subset of data on the client machine; and
applying one or more instructions to the selected web page, the instructions defined by at least one of one or more pre-defined criteria defining one or more types of the subset of data associated with the web page and one or more pre-defined confidence intervals for locating the subset of data in accordance with said one or more types on the selected web page, the one or more pre-defined confidence levels based on respective one or more reference locations spatially located on the selected web page;
wherein the identifying of the candidate subset of data further comprises:
determining a plurality of probable candidate data matching the pre-defined criteria and at least one of the pre-defined confidence intervals;
defining a weight for each of the pre-defined confidence intervals to define a relative importance thereof; and
ranking the plurality of probable candidate data based upon the weight to determine at least one candidate data from the plurality of probable candidate data.

2. The method of claim 1, further comprising: providing an interface to confirm or amend the candidate subset of data, wherein the candidate subset of data comprises at least one type of the subset of data and at least one value corresponding to each type for an item on the web page.

3. The method of claim 2, further comprising: storing the candidate subset of data as confirmed or amended to define a rich bookmark, the rich bookmark comprising an address of the web page and the stored candidate subset of data for subsequent retrieval and display.

4. The method of claim 2, further comprising:
receiving a response via the interface amending the candidate subset of data; and
in accordance with the response, updating at least one of: the pre-defined confidence intervals or the pre-defined criteria.

5. The method of claim 4, further comprising updating the pre-defined confidence intervals in response to receiving at least a pre-determined number of amendments to the candidate subset of data having a same type.

6. The method of claim 2 wherein the client machine is a wireless mobile device requesting the selected web page, and the interface is presented on the wireless mobile device to allow the amending or confirming of the candidate subset of data, the amending or confirming defining the subsequent display of the candidate subset of data when requesting another web page.

7. The method of claim 6 wherein the web site comprises an e-commerce web site and wherein identifying the candidate subset of data comprises identifying at least one e-commerce item for purchase from at least some of the web pages of the web site to conduct an e-commerce transaction on the wireless mobile device.

8. The method of claim 1, wherein the pre-defined criteria are provided in accordance with a genre of said web site, said genre selected from the group of genres consisting of: e-commerce, news, sports, and weather.

9. The method of claim 1, wherein the one or more types of the subset of data is selected from the group consisting of: an image, a description, a price, a title, and text data for characterizing the subset of data.

10. A system for identifying a subset of data from a selected web page of a web site for display on a client machine, the system comprising:
    at least one computing device comprising a processor and a memory coupled thereto, said memory storing one or more instructions and data for configuring the processor to:
    dynamically generate one or more instructions for identifying and displaying a candidate subset of data on the client machine;
    apply one or more instructions to the selected web page, the instructions defined by at least one of one or more pre-defined criteria defining one or more types of the subset of data associated with the web page and one or more pre-defined confidence intervals for locating the subset of data in accordance with said one or more types on the selected web page, the one or more pre-defined confidence levels based on respective one or more reference locations spatially located on the selected web page;
    wherein when identifying the candidate subset of data, the instructions and data further configure the processor to:
        determine a plurality of probable candidate data matching the pre-defined criteria and at least one of the confidence intervals;
        define a weight for each of the pre-defined confidence intervals to define a relative importance thereof; and
        rank the plurality of probable candidate data based upon the weight to determine at least one candidate data from the plurality of probable candidate data.

11. The system of claim 10, wherein the instructions and data configure the processor to:
    define an interface having one or more options to confirm or amend the candidate subset of data, wherein the candidate subset of data comprises at least one type of subset of data and at least one value corresponding to each type for an item on the web page.

12. The system of claim 11, wherein the instructions further configure the processor to: store the candidate subset of data as confirmed or amended to define a rich bookmark, the rich bookmark comprising an address of the web page and the stored candidate subset of data for subsequent retrieval and display.

13. The system of claim 11, further wherein the interface receives a response amending the candidate subset of data; and the instructions and data further configure the processor to:
    in accordance with the response, update at least one of: the pre-defined confidence intervals or the pre-defined criteria.

14. The system of claim 11, wherein the instructions and data configure the processor to update the pre-defined confidence intervals in response to receiving at least a pre-determined number of amendments to the candidate subset of data having a same type.

15. The system of claim 11 comprising a wireless mobile device configured as a one of said at least one computing device for requesting the selected web page, and the instructions and data configuring the processor to present the interface on the wireless mobile device to allow the amending or confirming of the candidate subset of data, the amending or confirming defining the subsequent display of the candidate subset of data when requesting another web page.

16. The system of claim 15 wherein the web site comprises an e-commerce web site and wherein identifying the candidate subset of data comprises identifying at least one e-commerce item for purchase from at least some of the web pages of the web site to conduct an e-commerce transaction on the wireless mobile device.

17. The system of claim 10, wherein the pre-defined criteria are defined in accordance with a genre of said web site, said genre selected from the group of genres consisting of: e-commerce, news, sports, and weather.

18. The system of claim 10, wherein the one or more types of the subset of data is selected from the group consisting of: an image, a description, a price, a title, and text data for characterizing the subset of data.

19. A computer program product comprising a non-transitory medium for storing one or more computer readable instructions for identifying a subset of data from a selected web page of a web site for display on a client machine, which instructions when executed by a computer processor configure the processor for:
    dynamically generating, at a server machine, one or more instructions for identifying and displaying a candidate subset of data on the client machine; and
    applying one or more instructions, dynamically generated at a server, to the selected web page, the instructions defined by at least one of one or more pre-defined criteria defining one or more types of the subset of data associated with the web page and one or more pre-defined confidence intervals for locating the subset of data in accordance with said one or more types on the selected web page, the one or more pre-defined confidence levels based on respective one or more reference locations spatially located on the selected web page;
    wherein the identifying of the candidate subset of data further comprises:
        determining a plurality of probable candidate data matching the pre-defined criteria and at least one of the pre-defined confidence intervals;
        defining a weight for each of the pre-defined confidence intervals to define a relative importance thereof; and
        ranking the plurality of probable candidate data based upon the weight to determine at least one candidate data from the plurality of probable candidate data.

20. A method of identifying a subset of data from a selected web page of a web site for display on a client machine, the method comprising:
    maintaining one or more pre-defined criteria defining one or more types of the subset of data;
    maintaining one or more pre-defined confidence intervals defining a pattern for locating the subset of data in accordance with said one or more types on the selected web page, the one or more pre-defined confidence levels based on respective one or more reference locations spatially located on the selected web page;

dynamically generating, at a server machine, one or more instructions for identifying and displaying a candidate subset of data on the client machine, the instructions defined by at least one of the one or more pre-defined criteria; and
applying the one or more instructions to the selected web page in accordance with the pre-defined confidence intervals and the pre-defined criteria for identifying a candidate subset of data and presenting same to a client machine;
wherein the identifying of the candidate subset of data further comprises:
   determining a plurality of probable candidate data matching the pre-defined criteria and at least one of the confidence intervals;
   defining a weight for each of the pre-defined confidence intervals to define a relative importance thereof; and
   ranking the plurality of probable candidate data based upon the weight to determine at least one candidate data from the plurality of probable candidate data and present same to the client machine.

21. The method of claim 20 further comprising:
receiving a response from the client machine amending the candidate subset of data, wherein the candidate subset of data comprises at least one type of the subset of data and at least one value corresponding to each type for an item on the web page; and
amending at least one of the pre-defined confidence intervals or the pre-defined criteria in dependence upon the received response.

22. The method of claim 21, further comprising amending the pre-defined confidence intervals in response to receiving at least a pre-determined number of amendments from the client machine to the candidate subset of data having a same type.

\* \* \* \* \*